United States Patent [19]
Bailey et al.

[11] Patent Number: 5,729,573
[45] Date of Patent: Mar. 17, 1998

[54] HIGH PERFORMANCE COMMUNICATIONS INTERFACE

[75] Inventors: Jay Patrick Bailey, North Easton; Brian J. Copley, Mansfield; Mark J. Freitas, East Walpole, all of Mass.

[73] Assignee: Microcom Systems, Inc., Norwood, Mass.

[21] Appl. No.: 461,506

[22] Filed: Jun. 5, 1995

Related U.S. Application Data

[63] Continuation of Ser. No. 300,490, Sep. 2, 1994, Pat. No. 5,644,593.
[51] Int. Cl.$^6$ .................................................. H04B 1/38
[52] U.S. Cl. ........................... 375/222; 375/377; 395/275
[58] Field of Search .............................. 375/219, 220, 375/222, 377; 379/93; 364/241.9, 240.5, 919; 395/275, 325

[56] References Cited

U.S. PATENT DOCUMENTS

| | | | |
|---|---|---|---|
| 4,639,910 | 1/1987 | Toegel et al. | 370/58 |
| 5,038,299 | 8/1991 | Maeda | 364/519 |
| 5,202,899 | 4/1993 | Walsh | 375/222 |
| 5,239,627 | 8/1993 | Beck et al. | 395/275 |
| 5,331,672 | 7/1994 | Evans et al. | 375/222 |
| 5,408,614 | 4/1995 | Thornton et al. | 395/275 |

*Primary Examiner*—Temesghen Ghebretinsae
*Attorney, Agent, or Firm*—Lappin & Kusmer LLP

[57] ABSTRACT parallel interface is provided between a standard parallel port of a computer system and a modem so as to increase the data transfer rate between the two systems without modifying the hardware of the computer system and independently of the application program running on the computer system.

20 Claims, 19 Drawing Sheets

HIGH PERFORMANCE COMMUNICATIONS INTERFACE

This is a continuation of application Ser. No. 08/300,490 filed on Sep. 2, 1994 U.S. Pat. No. 5,644,593.

Copyright, 1993, 1994, Microcom Systems, Incorporated. A portion of the disclosure of this patent document contains material which is subject to copyright protection. The copyright owner has no objection to facsimile reproduction by anyone of the patent document or the patent disclosure, as it appears in the U.S. Patent and Trademark Office patent file or records, but otherwise reserves all copyright rights whatsoever.

1. Field of the Invention

The present invention relates generally to interfaces between data communications equipment (DCE) and data terminal equipment (DTE), and more particularly to a high performance modem for connection with a computerized system through a parallel communications interface.

2. Background of the Invention

As used herein, data terminal equipment (DTE) is intended to refer to any data terminal device, including computerized systems such as computer peripherals, personal computers, mini and mainframe computer systems and terminals. Data communication equipment (DCE) is intended to refer to any type of a computer peripheral that can benefit from the high speed exchanges of data and status with DTE. This includes printers, plotters, and scanners as well as other DTE devices such as personal computers. Other types of DCEs include analog and digital communication devices for converting or encoding data transmitted through a transmission medium or communications channel to a remote site and for decoding data received through the medium from the remote site. The DCE usually is in the form of a modem, a device for modulating signals for transmission over a transmission medium to a remote site, and demodulating signals received through the medium from a remote site.

A serial interface is a data transmission or communications link between two DTEs, or two DCEs, or a DCE and a DTE. Data travels over a single transmission line from transmitter to receiver one bit at a time. Most personal computers and commercially available modems typically each include a serial port by which the devices can be connected, so as to form a serial interface, and through which data can be serially transferred. A typical bidirectional, serial interface includes at least three lines, one for transmission of data in one direction (from the computer to the modem), one for transmission of data in the other direction (from the modem to the computer) and a ground reference. Additional lines may be provided to support more efficient handshaking protocols whereby the two systems electrically connect and assure each other that they can understand one another before they transfer data between each other. The Electronic Industries Association RS-232 Specification and ITV-T (formerly CCITT) V.24 are the most frequently used examples of industry standard serial interface specifications which define the handshake protocol, connector pin assignments and signal levels for a serial interface.

A parallel interface is a communications link between two DTEs, two DCEs, or a DCE and a DTE, but typically between computers and printers. Data travels in data units over more than one line from transmitter to receiver, with at least two [data] bits being sent at a time. In some cases the data is sent a byte at a time (in most personal computers a byte is 8 bits). However, the data can be sent in groups of bits, each less than a byte (e.g., a "nibble" which can be one-half a byte, or four bits), or in groups of bits, each greater than a byte (e.g., a byte and a nibble at a time). In the latter two instances the bytes are divided up into the individual data units for transmission, transmitted and then reassembled as bytes. In all these cases the transfer is considered to be a parallel transfer, even though the data unit may be something other than a byte of data. A typical parallel interface, as used to interface a personal computer with a printer, includes eight (unidirectional) output data lines for transmitting data from the computer to the printer, four status output lines for communicating status to the printer and five status input lines for providing status data from the printer to the computer. In some parallel interfaces, the data lines are bidirectional, allowing data to be transferred to, as well as from, the computer via the eight data lines.

Various types of DCEs are used to transmit and receive data over a transmission medium, in the form of a communications channel or link. For example, the medium can be air in the case of cellular modems, or communication wires or cables, in the case of standard telephone line modems.

The data terminal equipment is typically connected to the data communication equipment when it is desirable to transmit data to or receive data from a remote site over the transmission medium. The DTE generates the data to be transmitted over the communications medium by the DCE to which the DTE is connected, and/or receives the data received by the DCE from the medium. Modems are defined by current standards to use serial interfaces as specified in the Electronic Industries Association (EIA) RS-232 and the ITU-T V.24 Specifications. Modems have not been defined to have other types of interfaces such as the parallel interface of a DTE. Presently, commercially available modems transmit data over standard voice grade telephone lines at maximum rates of 14,400 and 28,800 bits per second (bps) using sophisticated handshaking and error correcting protocols. However, utilizing data compression, modems are capable of effectively transmitting and receiving data across a communications channel at rates as high as the maximum DTE rate, typically 115,200 bps. These protocols and data compression techniques are typically defined by industry standards such as the ITU-T V Series Specifications and the Microcom Network Protocol (MNP). However, as will become more evident hereinafter, the operation of the DTE, and in particular the manner in which data is transferred from the DTE to a DCE to which it is connected, can limit the throughput of data between the DTE and the DCE to less than the maximum DTE rate, and hence limit the speed of the DCE.

More particularly, all commercially available modems sold prior to the present invention are believed to be serial communications devices, i.e., they communicate with the corresponding DTE, as well as any remote modem over a communication medium, by transmitting and receiving data through a serial interface. The DTE is accordingly usually connected through a serial port over a serial line to the modem. Most DTE process parallel data, a "byte" at a time. Thus, when transmitting data to a remote DCE, the DTE must break each byte into single bits which are transferred through a serial port to the modem over a serial line. The data is then sent using a standardized asynchronous framing scheme to a remote modem which assembles the bits of data together based on the same framing scheme before transferring the data over a serial line to the remote DTE. These modems also transmit data to and receive data from the DTE in a similar serial fashion. Typically, the electrical connections and handshake for this data transfer protocol are described in the EIA RS-232 or ITU-T V.24 specifications.

Usually, the DTE has a serial input-output port including a Universal Asynchronous Receiver Transmitter (UART) which sends and receives serial data to and from a modem. The UART provides the hardware interface between the serial port connector and the computer's control processing unit (CPU). When it receives data, it assembles the bits of data into bytes of data and notifies the CPU that a byte of serial data has been received.

In operation, in a typical personal computer, an unbuffered UART receives data one bit at a time until an asynchronously framed byte (8 bits of data, 1 start bit and 1 stop bit) is received. The UART then signals the CPU of the personal computer (via a serial interrupt) to indicate that it has received a byte of data. If the CPU does not service the serial interrupt before the next byte of data is received, the previous byte of data is over written and the UART indicates that an overrun error had occurred. Under ordinary conditions, the data is lost. The only way to avoid losing data is to utilize a higher level protocol or software layer which upon detecting the error can negotiate with the transmitting DTE at the remote end to retransmit the lost data or the block containing the lost data. In spite of these higher level protocols, even a small number of overrun errors can significantly degrade the performance the communications link. If the CPU is forced to service a serial interrupt for each byte of data at very high data rates, the frequency of serial interrupts that will occur can account for a significant amount of the CPU time causing the operating system to grind to a halt or make it so sluggish that it will be impractical.

Unfortunately, with DTE data rates approaching 115,200 bps, many personal computers have trouble keeping up because the interrupt driven communication port device drivers and applications have to service an interrupt for each character received. In addition, the interrupt latency on the receive side can cause a loss of data due to overruns. With the serial communications ports in most of today's personal computers interrupt driven, today's multitasking operating systems cannot service the serial communication interrupts fast enough to keep up with today's high speed modems to avoid losing data. Consequently, the communication link between the modem and the personal computer under these operating systems is limited to about 9,600 to 38,400 bps (depending upon CPU speed and other operating environment characteristics). Since 28,800 bps modems using data compression can effectively communicate at 115,200 bps, this is the limiting factor in utilization of the full bandwidth of these devices.

One solution to this problem has been the development of an improved UART with a buffer that holds up to 16 bytes of data. This enables the UART to receive and hold up to 16 bytes of data before it begins losing data to overrun errors. However, the majority of installed computers do not have this improved UART and cannot be upgraded, therefore, this solution is not available to many of the millions of computers currently in use. In addition, even the improved UART with 16 bytes of buffering capability does not guarantee that data will not be lost. Under certain conditions, where the operating system is busy servicing other devices, data can still be lost because there is no handshake between the DTE and the DCE.

With continuing developments in modem technology throughput limitations of using the serial port of the DTE presents an ever increasing problem. Even with today's high speed microprocessors, such as Intel's Pentium and the IBM/Motorola/Apple Power PC, the system cannot process the serial data fast enough. This problem is especially significant when running today's multitasking operating systems such as Windows, OS/2, Unix, and System 7. In addition, with the development of Graphical User Interfaces (GUIs), remote computing and the advance of Multimedia Technology, the ability to transmit data between a modem and a computer at speeds over 9,600 bps under these operating systems will be extremely desirable.

OBJECTS OF THE INVENTION

Accordingly, it is an object of this invention to provide a high performance interface between data communications equipment and data terminal equipment.

It is another object of the invention to provide a high performance interface between DTE and DCE irrespective of the operating system of the DTE.

Another object of the invention is to provide a high performance interface which transmits data in a non-serial manner between DTE and DCE.

Yet another object of the invention is to provide a high performance interface which transmits data between DTE and DCE in blocks at controlled intervals.

Still another object of the present invention is to transmit data bidirectionally between a DTE and DCE through the standard parallel port of the DTE.

And yet another object of the present invention is to provide an improved DCE for bidirectionally transmitting data in a non-serial manner between the standard parallel interface of a DTE, without modifying the hardware of the DTE.

And still another object of the present invention is to create a virtual link through which data can be transferred so as to bypass a serial link between a modem and computer system without effecting the application and operating programs running on the computer system.

And yet another object of the present invention is to transfer data more efficiently between a modem and a computerized system when using an interrupt driven communication port device driver in the computerized system. And still another object of the present invention is to prevent the loss of data transferred between a modem and computerized system due to data overruns.

Other objects and advantages of the present invention will become readily apparent to those skilled in this art from the following detailed description wherein a preferred embodiment is shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not restrictive.

SUMMARY OF THE INVENTION

The invention is directed to an improved DCM for transmitting and receiving parallel data. In accordance with the present invention, a data communications system is provided. The system is of the type having its own CPU with memory and is modified to include a parallel communications system, including a parallel port, for connection with the DTE through a standard parallel port normally used for transferring data to a printer. The DTE is modified so that the parallel port is used to transmit data to and from the parallel port of the DCE, without modifying the hardware of the DTE. A communications protocol is described for use with the DCE and DTE for effectively and efficiently transmitting data at high speeds between the two devices through the parallel interface.

In the preferred embodiment, in addition to the parallel communications system, the data communications system also includes two serial communications devices. One serial communications device is coupled to one or more signal processors and is used to handle communications, i.e., the transmission and receipt of data, over the communication channel. The other serial communications device and the parallel communications system are used to handle the communications with the DTE through a serial and parallel port, respectively, so as to define corresponding serial and parallel interfaces.

The data communications system includes means for determining whether the serial or parallel interface with the DTE is used for the transmission of data, based on predetermined preferences established through the communications protocol. The established communications protocol makes it preferable to utilize the parallel interface because it is capable of communicating at higher data rates than the serial interface. If the parallel interface does not exist (the connection is not made between the parallel ports of the data communications system and DTE), or data is not being transmitted effectively through the parallel interface, the data communications system will fall back to the serial interface if it exists. The data communications system also includes software for emulation of the various handshaking protocols used in a serial interface, when communicating over the parallel interface.

In accordance with the preferred embodiment of the present invention, the system also includes a software device driver for enabling the DTE to communicate with the data communications system either through the serial interface or the parallel interface depending upon various conditions determined by the communications protocol. Typically, the DTE will be a personal computer comprising at least one serial communication port and one parallel port and application software requiring a link with the data communications system. The software driver performs several functions. In the case of the parallel interface, it initializes the parallel printer port of the DTE, redirects the data such that the operating system and/or the application software running on the computer recognizes that the communications port is available and, if necessary, fools the DTE into thinking that the communications port is a serial port. In this configuration, the software driver interacts with the data communications system such that it appears to be a serial device to the operating system and the application software running on the DTE.

Another function of the software driver is to implement burst mode communications with the data communications system. Burst mode communications reduce the CPU overhead associated with conventional serial communications by receiving more than one byte of data at a time. Burst mode transfers are performed in a controlled environment whereby a predetermined number of data units are transmitted in a given interval. For example, the data communications system, in this case the modem, will receive and hold a predetermined number of data bytes from a remote DTE. The data communications system will then signal the DTE to initiate the transfer and then transmit blocks of data in bursts at as fast a rate as possible.

On the DTE side, the software driver will buffer the data from the operating system or the application software until it has a predetermined number of data units. The software driver will then signal the DCE to initiate the transfer and then transmit the blocks of data in bursts at as fast a rate as possible. This occurs transparent to the operating system and the application software running on the DTE.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE DRAWINGS

Figure 1:
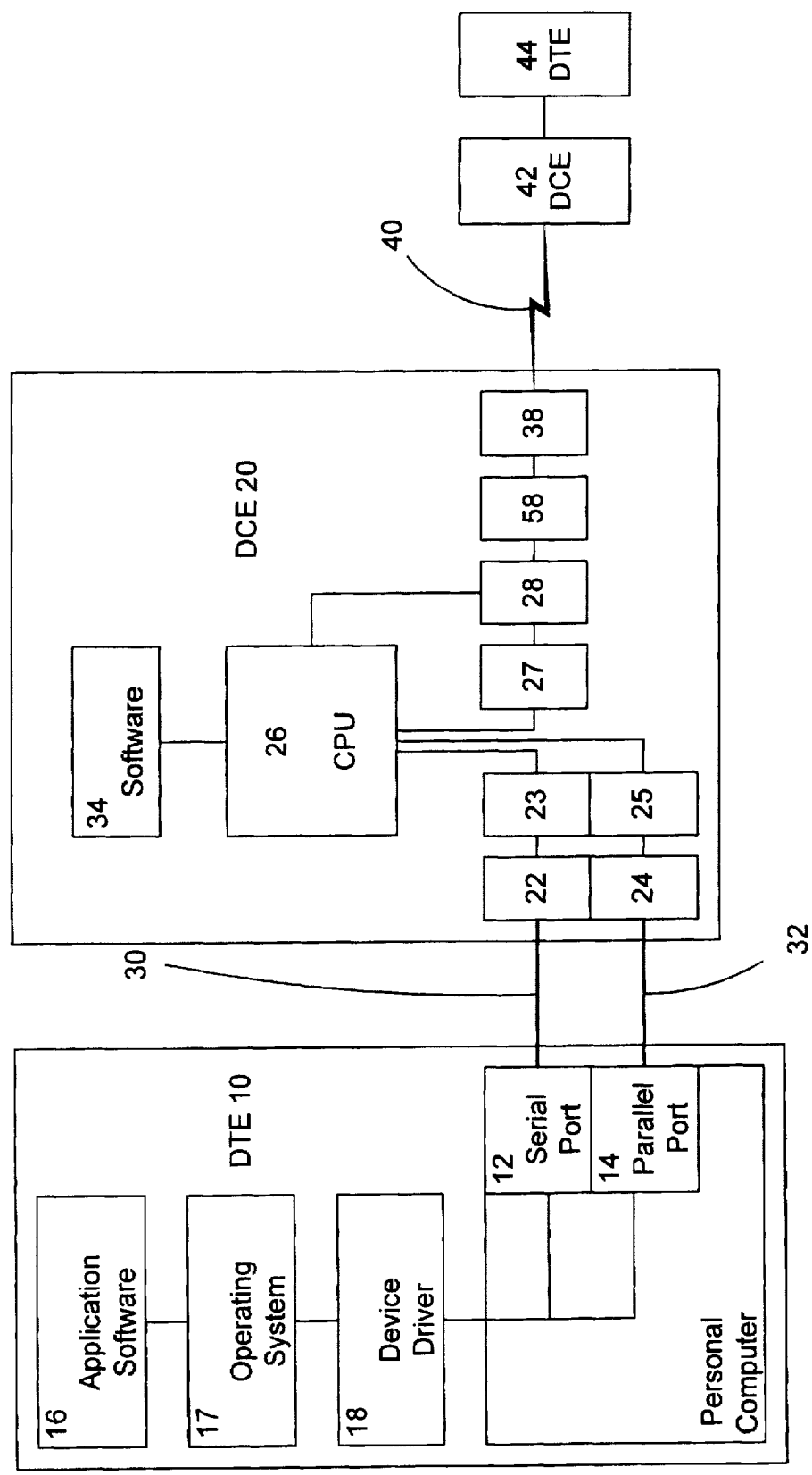
FIG. 1 is a block diagram showing interconnected DTE and data communications system in accordance with one embodiment of the invention.

FIG. 1 illustrates the preferred embodiment of the present invention. As shown, DTE 10, preferably in the form of a personal computer, such as an IBM desktop model or equivalent, includes at least one serial communication port 12 and one parallel printer port 14, as is standard on most available computers. The standard serial communication port 12 is available for transmitting data into and out of DTE 10 from and to data communications system or DCE 20. The standard parallel port 14 is typically provided for transmitting data to a printer, although suggestions have been made to use the parallel port for transmitting data to and from a network though a network adapter. See U.S. Pat. No. 5,299, 314 (Gates). In accordance with the present invention, specialized DTE hardware is not required so that the present invention is compatible with any DTE, such as the IBM personal computer, having a standard parallel port. DTE 10 is provided with application software 16 (designed to run on an operating platform 17) requiring a link with DCE 20, and a software driver 18 for enabling DTE 10 to communicate with DCE 20 in accordance with the principles of the invention either through serial port 12 or parallel port 14 as described in greater detail hereinafter. The port used will depend upon various conditions determined by a communication protocol, also described hereinafter.

In accordance with the present invention, DCE 20, preferably in the form of a modem, also includes a serial port 22 and a parallel port 24 for connecting the DCE to the corresponding serial port 12 and parallel port 14 of DTE 10 through a serial cable 30 and a parallel cable 32, respectively. DCE 20 includes input/output controllers 23 and 25, each including means for selectively transmitting and receiving data through ports 22 and 24 respectively. DCE 20 also includes CPU 26 and software 34 for controlling the functions of DCE 20 including the direction and flow of data and status through input/output devices 23 and 25.

DCE 20 also includes an input/output controller 27 and a data pump 28, both controlled by CPU 26 so as to modulate and compress data signals received by either input/output controller 23 or input/output controller 25 from DTE 10 before transmitting the data signals through the output port 38 over transmission medium 40 to remote DCE 42. Data pump 28 also demodulates and decompresses data signals received from the remote DCE 42 over the transmission medium 40. The data pump also carries out the necessary hand shaking and error correcting protocols with the remote DCE 42 useful in transmitting data over the medium 40, preferably in accordance with industry standards such as the CCITT V Series Specifications and the Microcom Network Protocol (MNP).

The data transmitted to and received from the transmission medium 40 is in a serial format. In this regard the remote DCE 40 is a device compatible with DCE 20 and is typically connected to a corresponding remote DTE 44. As shown DCE 20 is thus capable of transmitting over the transmission medium 40, data originating from DTE 10, and for receiving data transmitted from a remote site, such as from DCE 42 through the medium 40.

Thus, DCE 20 is modified to include a parallel communications system, including a parallel port 24, for connection with the DTE through the latter's standard parallel port 14 normally used for transferring data to and from a printer. The DTE 10 is modified so that the parallel port 14 is used to transmit data to and from the parallel port 24 of the DCE 20, without modifying the hardware of the DTE 10. As will be more evident hereinafter, all that is required is a modification of the driver 18.

A communications protocol is described below for use with DCE 20 and DTE 10 for effectively and efficiently transmitting data at high speeds between the two devices through the parallel interface created between the ports 14 and 24 and cable 32, and in the event transmission through the parallel port is not possible or is problematic, then preferably the system switches automatically and data is transmitted through the serial interface created between ports 12 and 22 and cable 30. In this respect the DCE 20 includes means for determining whether the serial or parallel interface with the DTE is used for the transmission of data, based on predetermined preferences established through the communications protocol. The established communications protocol makes it preferable to utilize the parallel interface because it is capable of communicating at higher data rates than the serial interface. The modem also includes software 34 for emulation of the various handshaking protocols used in a serial interface, when communicating over the parallel interface.

The software driver 18, in accordance with the teachings of the present invention, performs several functions. In the case of the parallel interface, it initializes the parallel port 14 of DTE 10, redirects the data transferred through the parallel port 14 such that the operating system 17 and/or the application software 16 running on DTE 10 recognizes that a communications port is available and, if necessary, fools the operating system 17 and/or the application software 16 into thinking that the communications port is a serial port so that data generated for transmission to DCE 20 or to be received from DCE 20 will be transferred through the parallel interface. In this configuration, software driver 18 interacts with DCE 20 in accordance with a communications protocol such that parallel interface formed by ports 14 and 24 appears to be a serial interface to the operating system and the application software 16 of DTE 10.

Another function of software driver 18 is to preferably implement burst mode communications between DTE 10 and DCE 20 through the parallel interface formed by ports 14 and 24 and cable 32 or the serial interface formed by ports 12 and 22 and cable 30. Burst mode transfers are performed in a controlled environment whereby a predetermined number of data bytes are transmitted in a given interval. One significant advantage of burst mode transfer is that the receiver receives more than one byte per interrupt, thus saving the overhead associated with the interrupt service routine normally used with a serial interface. For example, DCE 20, in this case the modem, will receive and hold data from medium 40. DCE 20 will then signal DTE 10 to initiate and transfer blocks or packets of data in bursts at as fast a rate as possible through the communications port. Upon receiving an interrupt or as part of a polled event, the DTE 10 will begin its receive process to receive the block or packet of data at as fast a rate as possible.

On the DTE side, the software driver 18 will buffer the data from the operating system or the application software 16 until it has a predetermined number of data bits. The software driver 18 will then signal DCE 20 to initiate the transfer and then transmit blocks or packets of data in bursts at as fast a rate as possible. This occurs transparent to the operating system 17 and the application software 16 running of the DTE 10.

Figure 2:
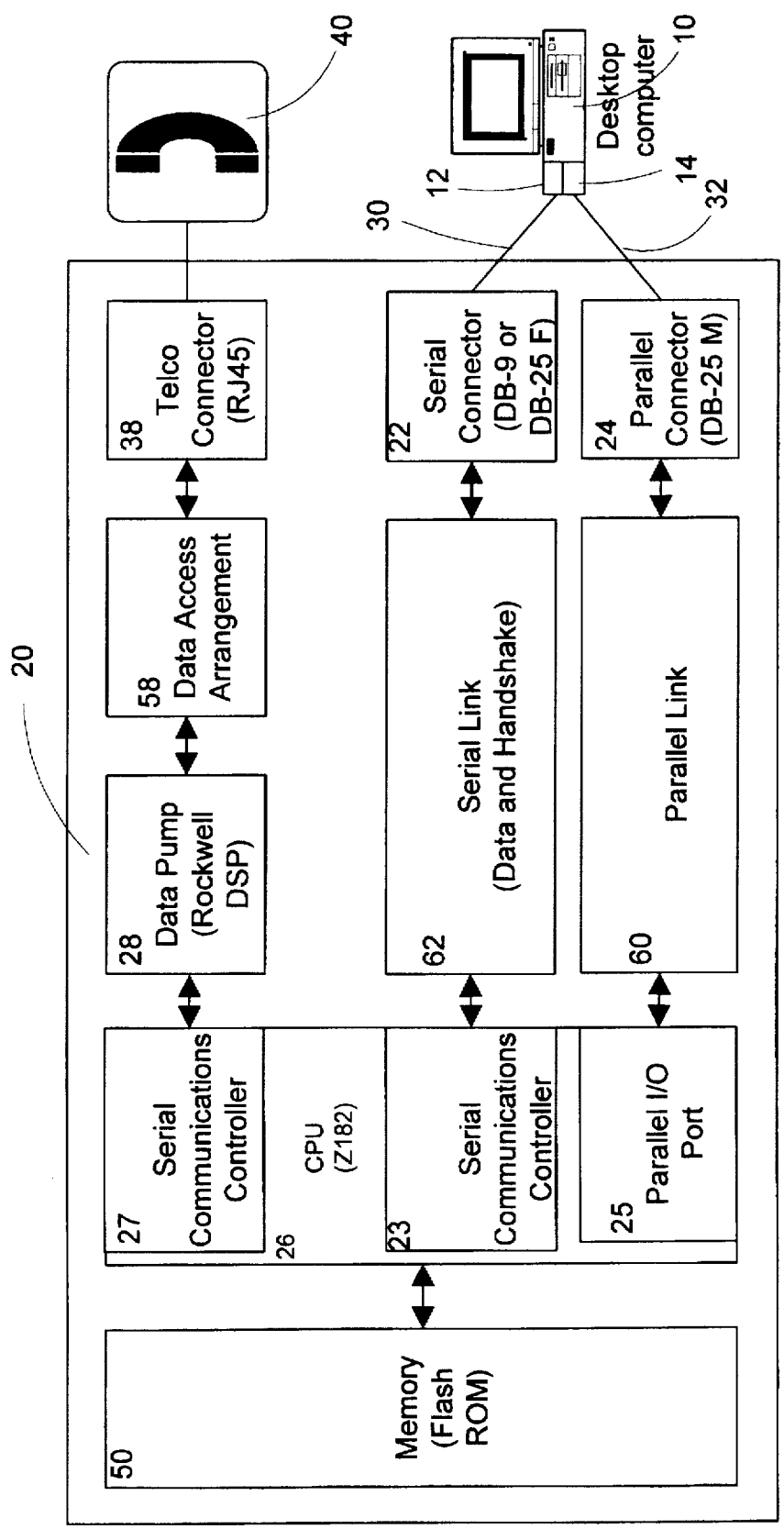
FIG. 2 is a block diagram of a modem constructed in accordance with present invention.

The preferred system communications system 20, preferably in the form of a modem is shown in greater detail in FIG. 2. As shown system 20 has output serial port 38 connected to a transmission medium 40, which is shown as a telephone line, although the system can be constructed to transmit through other types of transmission media. In the case of a telephone line, port 38 is of a type of connector which facilitates a physical connection to the telephone service line. Preferably, the Telco Connector of port 38 is an industry standard connector such as an RJ-11 or RJ-45.

Transmitting data across the parallel interface enables the data rate between system 20 and DTE 10 to be increased so as to achieve rates in excess of 115,200 bps. When employing standard compression techniques, the effective data rate through the medium 40 can therefore exceed 115,200 bps. so that the remote DTE 44 can receive data at its maximum rate. These data rates are achieved using industry standard error correction and data compression methods such as CCITT V Series Specifications and the Microcom Network Protocol.

The modem 20 includes CPU 26 and associated memory 50. The modem 20 also includes a DCE serial I/O controller 27, a DCE serial I/O controller 23 and at least one bidirectional parallel I/O controller 25. Preferably, the serial I/O controller 23 is connected through a serial link 62 to the serial connector 22, while parallel I/O controller 25 includes two addressable eight bit ports and is connected to the parallel connector 24 through a parallel link 60. Any of the serial I/O controllers 27, 23 and parallel controller 25 can be integrated with the CPU or implemented in discrete logic. In the preferred embodiment, the CPU includes integrated serial communications controllers and parallel I/O ports. One example of such a CPU is the Z80182 available from ZILOG, Inc. of Campbell, Calif.

The DCE serial communications controller 27 manages the communications between the modem 20 and the remote DCE 42 (seen in FIG. 1). The DCE serial communications controller 27 sends data to and receives data from the data pump 28. Data pump is preferably a RC288DPL/VFC chip set, from Rockwell International of Newport Beach, Calif. although other data pumps are well known. The data pump 28 converts the digital data transmitted by the DCE serial communications controller 52 to analog data in accordance with industry standards for communications (i.e., CCITT V Series and Microcom Network Protocol). The data access arrangement 58 provides the electrical interface (load balancing, etc.) between the data pump 28 and the transmission medium 40, in accordance with industry standards.

The data pump 28 also reports perceived telephone line conditions and characteristics to the CPU 26. In response to these line conditions and characteristics, CPU 26, under software control, instructs the data pump 28 to adjust the communication speed up or down to compensate for line conditions in a manner which is well known.

The DCE serial communications controller 23 manages the serial communications link between the modem 20 and the DTE 10. The modem 20 is connected to the DTE 10 via a cable 30 between the serial connector 22 and a similar but opposite gender connector 12 on the DTE 10. In the preferred embodiment, the serial connector 22 is an industry standard "D-sub" female connector having either 25 or 9 connections, such as a DB-9 or DB-25F connector.

Under software 34 control, the CPU 26 controls the DCE serial communications controller 23 in order to provide an industry standard serial interface with the serial port of the DTE 10. Modem 20 can also provide software support enabling the DTE 10 to control modem 20 via commands received through either the serial or parallel interface. In the preferred embodiment, the serial interface is defined by EIA RS-232 Specification and the modem 20 responds to the AT Command Set defined by Hayes Microcomputer Products, Inc. of Norcross, Ga.

The parallel I/O port 25 provides an alternative communications link between the modem 20 and DTE 10. The modem 20 is connected to the DTE via cable 32 connected between the parallel connector 24 and a similar but opposite gender connector 14 on the DTE 10. In the preferred embodiment, the parallel connector 24 is an industry standard "D-sub" male connector having 25 connections, such as a DB-25M connector. In addition, the parallel link 60 preferably includes a 74LS 245 or equivalent buffer for bidirectional transfer of data and a 74LS244 or equivalent buffer for the unidirectional transfer of data, status and control (5 lines from the modem to the PC and 3 lines from the PC to the modem).

The parallel interface will function differently depending upon the type of parallel port 14 in the DTE 10 to which it is connected. The parallel port of a personal desktop computer typically comprises three eight bit parallel I/O ports, one for transferring data, one for transmitting status, and one for receiving status. There are basically two standard types of parallel port configurations for desktop computers, a unidirectional and a bidirectional. The unidirectional port has eight data lines but can only send data out of the port. To compensate for this, the modem 20 can transfer data to the desktop computer 10, a nibble (four bits) at a time via four status lines, so that a byte is sent in two intervals. The bidirectional port has eight data lines that can both send and receive data. The bidirectional port also includes the four status lines which can be used in addition to the eight data lines to transmit twelve bits (a byte and a nibble) at one time to the desktop computer. In addition, there exists an enhanced parallel port (EPP) specification, IEEE 1284, which includes enhanced bus transceivers to reduce noise and permit higher speed data transfers and a communication protocol to permit several devices to share a parallel port, simultaneously. In addition, some parallel ports do not respond to interrupts and thus cannot support interrupt driven operation.

Figure 3:
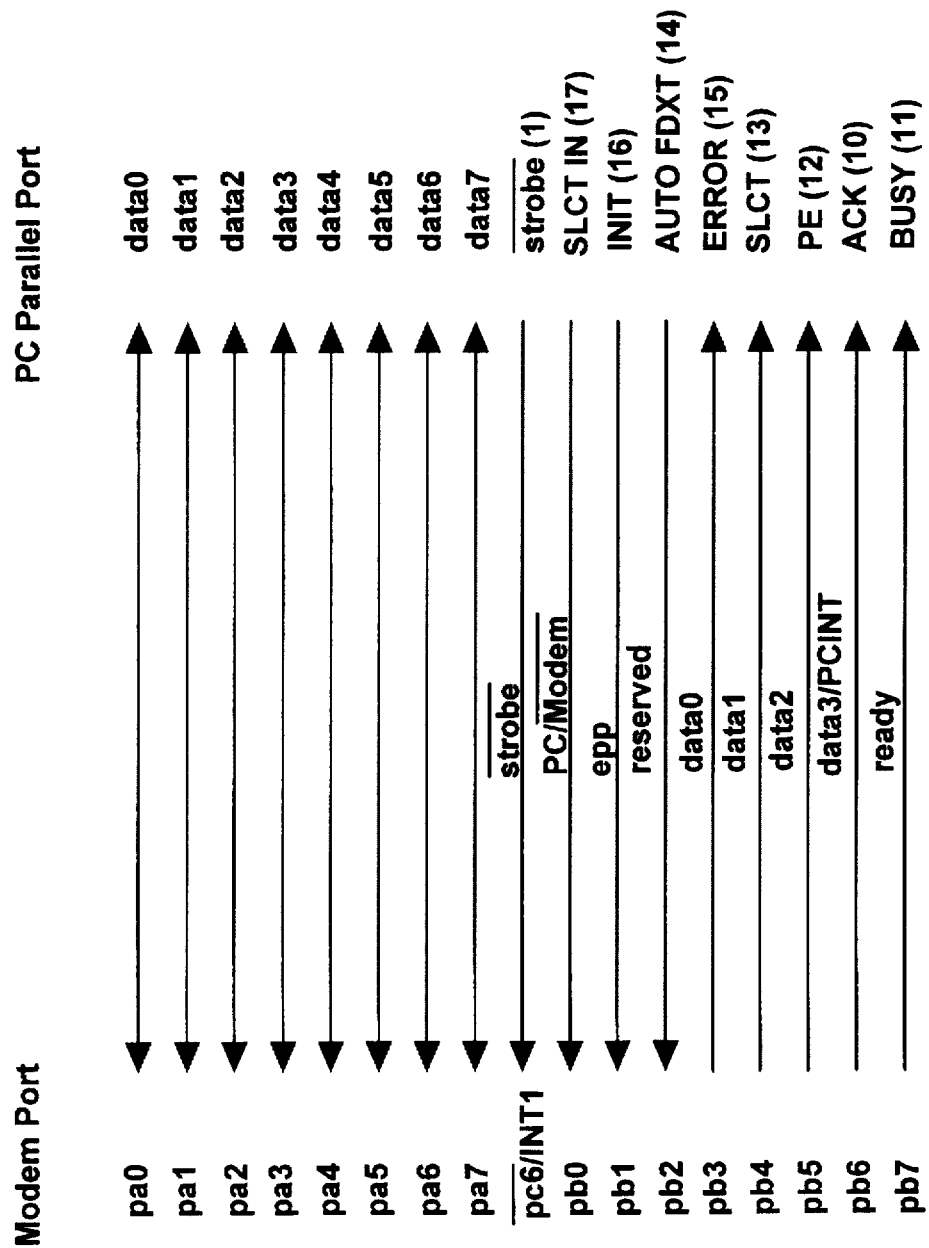
FIG. 3 is a illustration of the pin definitions of one embodiment of the parallel port interface of the present invention.

In the preferred embodiment, the modem parallel link 60 includes eight bidirectional data lines and at least four input status lines and at least five output status lines. These lines represent the parallel interface and are shown in FIG. 3. The modem 20 also includes software which enables the CPU 26 to effectively communicate through the parallel interface as well as assist the software device driver in the Desktop computer 30 in emulating a serial interface.

The following is a functional description of the data and status lines used by the preferred modem 20 and the computer 10 to transfer data via the parallel interface:

Data Lines—The 8 data lines from the PC parallel port are connected to Port A on the CPU 26 parallel port (PPA). Bits 3–6 of Port B on the CPU 26 parallel port (PPB) are used as data lines to the PC and are connected to the parallel port's status port bits 3 thru 6, respectively. Bit 7 on the PPB and bit 7 on the parallel port's status port will be used for the Ready line. This will leave the 4 bits of data in the high order nibble of the register and should simplify the logic needed to assemble the byte).

With a unidirectional parallel port, PPA will be configured as an input only port and PPB bits 3–6 will be used as output data lines to the PC. The unidirectional parallel port can be configured to transfer data either in half duplex or full duplex modes. With a bidirectional parallel port, PPA will be configured as an input port when idle (so it is always ready to receive data), and will be changed to an output port when data needs to be transmitted to the PC (PPB bits 3–6 will not be used as data lines, however, the protocol could be extended to allow the modem to transmit 12 bits at a time). The bidirectional parallel port can also be configured to transfer data either in half duplex (8 bits at a time) or in full duplex (4 bits in each direction simultaneously).

Strobe (Active Low, PC Controlled)—The Strobe line will be connected from the STROBE line (PIN 1) on the PC parallel port to the pc6/INT1 pin on the CPU 26. When transferring data from the PC to the modem, the rising edge of Strobe will signal that data on PPA is valid. When transferring data from the modem to the PC, the rising edge of Strobe will acknowledge the receipt of data.

PC/Modem (PC Controlled)—The PC/Modem line will be connected from the SLCT IN (PIN 17) line on the PC parallel port to PPB bit 0. The PC/Modem line is set to 1 by the PC when it needs to transmit data and is set back to 0 when the block transfer is complete. The PC/Modem line must be held high for 5 uS before the PC can take control of the data lines. If during the 5 μsec., the Ready line goes high, the PC must lower the PC/Modem line and prepare for the receipt of data.

EPP (PC Controlled)—The EPP line will be connected from the INIT (PIN 16) line on the PC parallel port to PPB bit 1. The EPP line will be set to 0 if a standard unidirectional parallel port is being used by the PC and a 1 if a bidirectional parallel port is being used. This assumes that the PC can poll the parallel port to determine if it is bidirectional. A handshake on powerup may be needed to determine if the data bus is bidirectional. A handshake on powerup is preferred since it would free up a PC to modem control line for an alternate use.

Ready (Active Low, Modem Controlled)—The Ready line will be connected from PPB bit 7 to the BUSY line (PIN 11) on the PC parallel port. This line is set manually by the modem firmware.

When the modem is transmitting data, the Ready line will go inactive (high) to indicate to the PC that the data has been loaded and the data bus is stable and ready for the transfer. The Ready line will be set back to 0 following the falling edge of Strobe.

When the modem is receiving data, the Ready line will go inactive (high) to indicate to the PC that the data has been latched and the input register is full and cannot accept any more data. Due to interrupt latency in the modem, the Ready line may take up to 200 μsec. to go inactive (high) following the initial toggle of Strobe. The Ready line will be set back to active (low) following the execution of the read operation.

PCINT/ACK (Active High, Modem Controlled)—The PCINT line will be connected from PPB bit 6 to the ACK line on the parallel port. When in idle mode, the modem will initiate a block transfer to the PC by interrupting the PC via raising PCINT. When in a 4 bit data transfer, PCINT will used to send data (data3) to the PC and must be cleared before exiting the interrupt service routine. When in a 8 bit data transfers, PCINT will be cleared once the interrupt has been acknowledged and will not be used during the transfer.

Parallel Port Data Transfer Handshake

In operation the following describes the general operation of the preferred embodiment where the modem is connected to a personal computer (PC):

1. Data Available Interrupts

The modem 20 will interrupt the PC 10 by raising the PCINT/ACK. The PC 10 will acknowledge the interrupt by toggling the Strobe pin.

The PC 10 will interrupt the modem 20 by writing a byte of data on the data bus and toggling the Strobe pin. The modem will acknowledge the interrupt by setting the Ready line to inactive (high).

2. PC to Modem 8 bit Data Transfers

Figure 4:
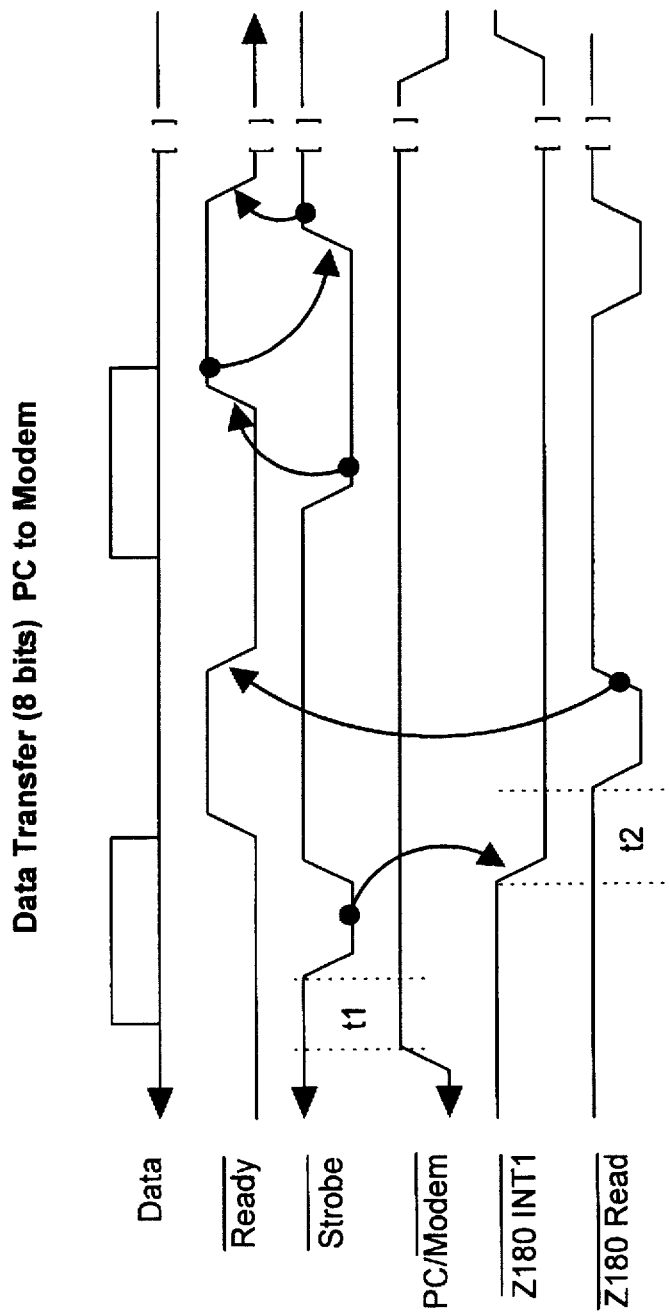
FIGS. 4–6 are timing diagrams for use in illustrating the handshake routine of the parallel interface.

The handshake sequence to be used to send data from the PC to the modem is described in FIG. 4. When the PC wants to initiate a data transfer, it must first raise the PC/Modem line to attempt to take control of the data bus. The PC must then wait for at least 5 μsec. to determine if the modem is attempting to transmit at the same time. If the Ready line does not go inactive (high) during the 5 μsec. period, the PC will then have control of the data bus and can begin transmitting. The PC will then write the first byte of data to the data port and then toggle the Strobe line. The rising edge of the Strobe signal will trigger a CPU interrupt (INT1) and the CPU will enter the interrupt service routine (ISR). Upon entering the ISR, the Ready line will be immediately set inactive (high) to acknowledge the interrupt. The ISR will then read the 8 bits of data and set the Ready line active (low) to signal the PC it can accept more data. At this point both sides are synchronized and will enter their polling loops and the block transfer will begin. Upon detecting the Ready line active (low), the PC will write the next byte of data and set the Strobe line active (low), and wait for the Ready line to go inactive (high). Upon detecting the Strobe line active (low) the modem will set the Ready line inactive (high), read the data, and wait for the Strobe line to go inactive (high). Upon detecting the Ready line inactive (high) the PC will set the Strobe line inactive (high) and wait for the Ready line to go inactive (low). Upon detecting the Strobe line inactive (high), the modem will set the Ready line active (low). This procedure will continue until the block transfer is complete.

It is noted that due to interrupt latency, the modem 20 can take up to 200 μsec. to respond to an interrupt request, and that in order to prevent bus contention, when the PC wants to transmit, it must raise the PC/Modem line and then insure the Ready line does not go high within the next 5 μsec. If the Ready line does go high it must prepare to receive the data from the modem.

3. Modem to PC 4 bit Data Transfers

Figure 5:
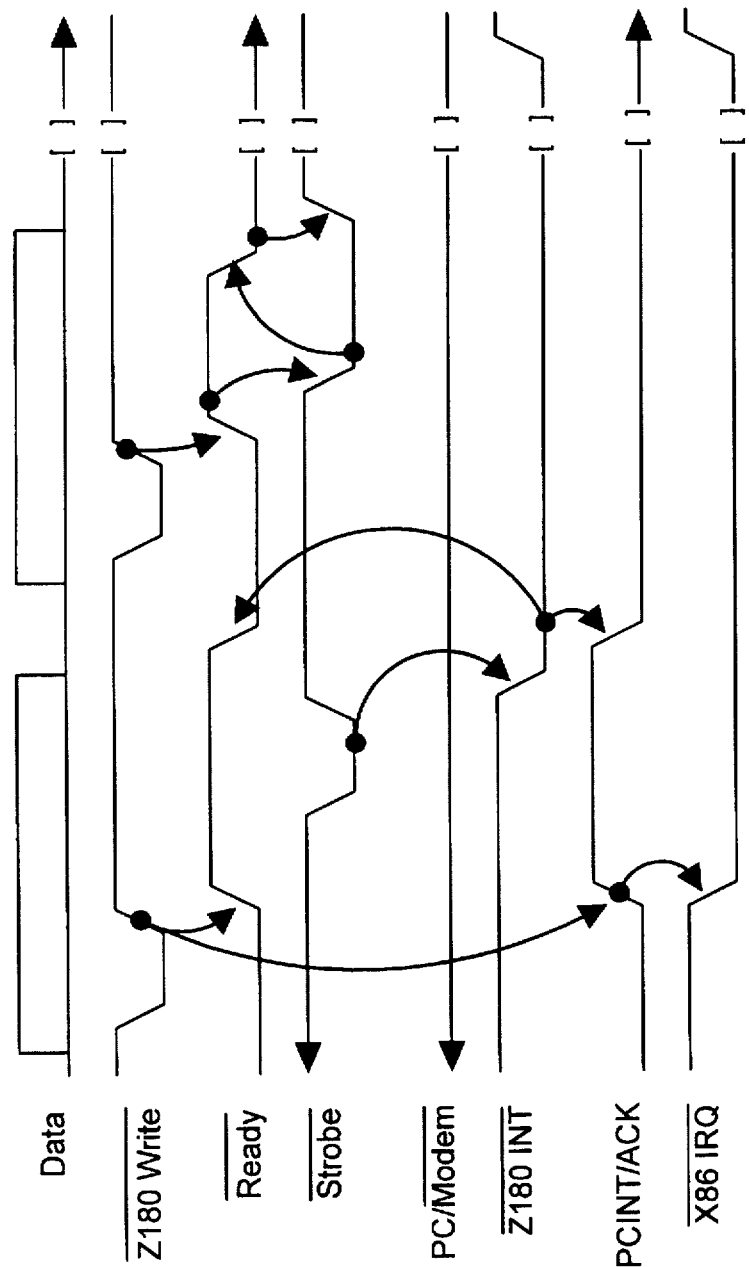

The handshake sequence to be used to send data from the modem to the PC, 4 bits at a time, is described with reference to FIG. 5. When the modem wants to initiate a data transfer, it must set the Ready line inactive (high) and then raise the PCINT/ACK line to the PC to generate an interrupt. When the PC gets to it's ISR it will toggle the Strobe line to signal that it has received the interrupt. On the initial read of the status port by the PC, bits 3–6 are not data and should be discarded. The rising edge of the Strobe line will generate an interrupt on the modem. When the modem gets to it's ISR it will lower the PCINT/ACK line, and then activate (lower) the Ready line to signal that it is ready to send more data. At this point both sides are synchronized and will enter their polling loops and the block transfer will begin. The modem will then write the most significant nibble of the data on PPB bits 3–6 and set the Ready line inactivate (high). Upon detecting the Ready line inactive (high) the PC will read the nibble of data from the status port bits 3–6, and set the Strobe line active (low) and wait for the Ready line to go active (low). Upon detecting the Strobe line active (low), the modem will set the Ready line active (low) and wait for the Strobe line to go inactive (high). Upon detecting the Ready line active (low), the PC will set the Strobe line inactive (high). The same procedure is repeated for the least significant nibble. The polling procedure will continue until the block transfer is complete.

It is noted that the first Strobe issued by the PC in a 4 bit transfer is to acknowledge the interrupt. The 4 bits read on the status port bit 3–6 are not data and should be discarded. Further, the PCINT/ACK line is used initially to interrupt the PC. Once the PC has toggled Strobe to acknowledge the interrupt, the PCINT/ACK line is used as bit 3 in the nibble transfer. Also, the PCINT/ACK line must be set to 0 upon exiting the ISR.

4. Modem to PC 8 bit Data Transfers

Figure 6:
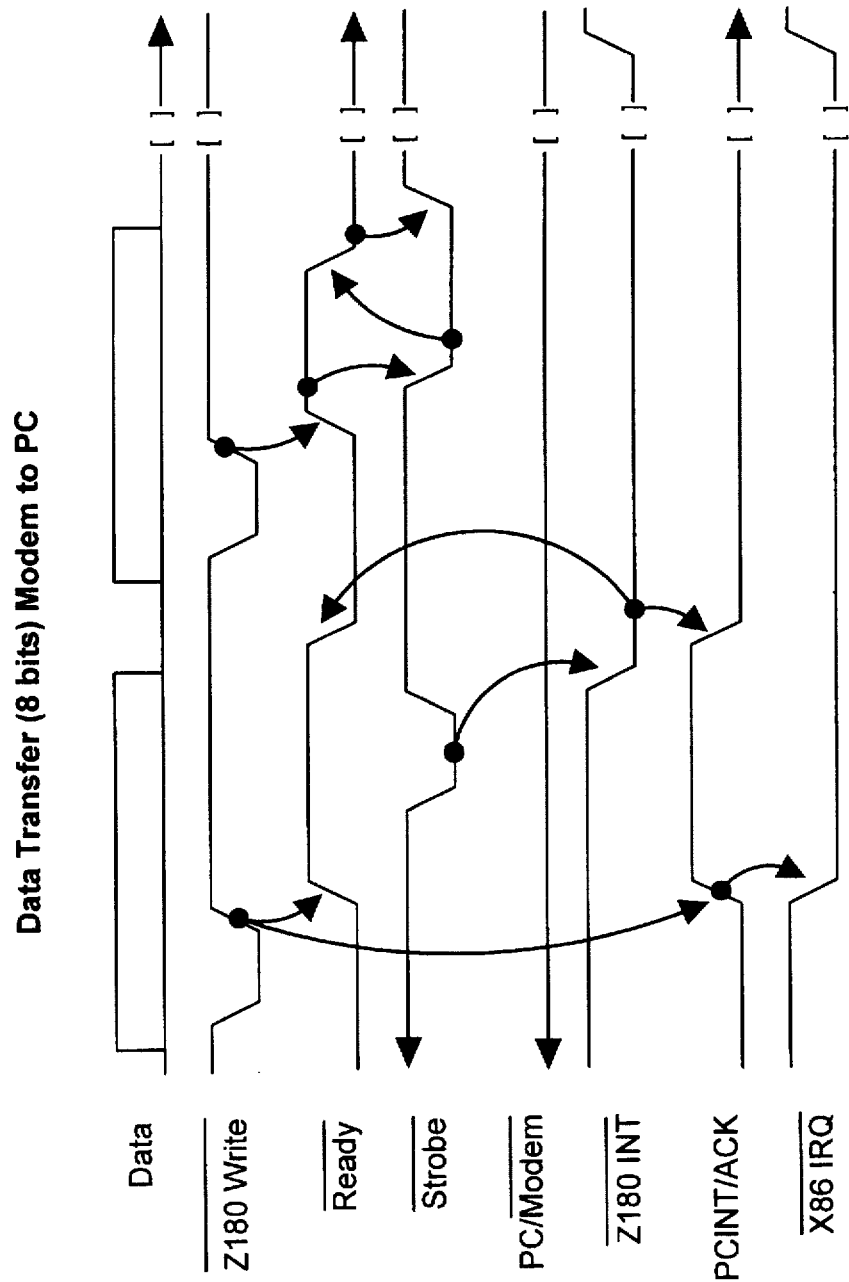

The handshake sequence to be used to send data from the modem to the PC, 8 bits at a time, is described with reference to FIG. 6. When the modem wants to initiate a data transfer, it must set the Ready line inactive, write the byte of data to the PPA, and then raise the PCINT/ACK line to the PC to generate an interrupt. When the PC gets to it's ISR it will toggle the Strobe line to signal that it has received the data. The rising edge of the Strobe line will generate an interrupt on the modem. When the modem gets to it's interrupt service routine (ISR) it will lower the PCINT/ACK line, and then activate (lower) the Ready line to signal that it is ready to send more data. At this point both sides are synchronized and will enter their polling loops and the block transfer will begin. The modem will then write the next byte of data and set the Ready line inactivate (high). Upon detecting the Ready line inactive (high), the PC will read the byte of data, and set the Strobe line active (low) and wait for the Ready line to go active (low). Upon detecting the Strobe line active (low), the modem will set the Ready line active (low) and wait for the Strobe line to go inactive (high). Upon detecting the Ready line active (low), the PC will set the Strobe line inactive (high). This procedure will continue until the block transfer is complete.

Implementing the functions of the preferred embodiment of the communications system 20 and driver 18, an example of a program module for communicating over a parallel enterface with the CPU of the modem is attached as Appendix B, while the software for accomplishing the necessary modifications to a Microsoft Windows based device driver is attached as Appendix A.

Using these programs, referring to the flow charts shown in FIGS. 7-13 the following is a more detailed description of the operation of the modem in which the CPU 26 is used to effectively communicate through the parallel interface as well as assist the software device driver in the computer 10 in emulating a serial interface when transmitting through the parallel interface. The flow charts in FIGS. 14-18 show the complementary functions performed by the software device driver.

Modem software functions with respect to the PC parallel port

Figure 7:
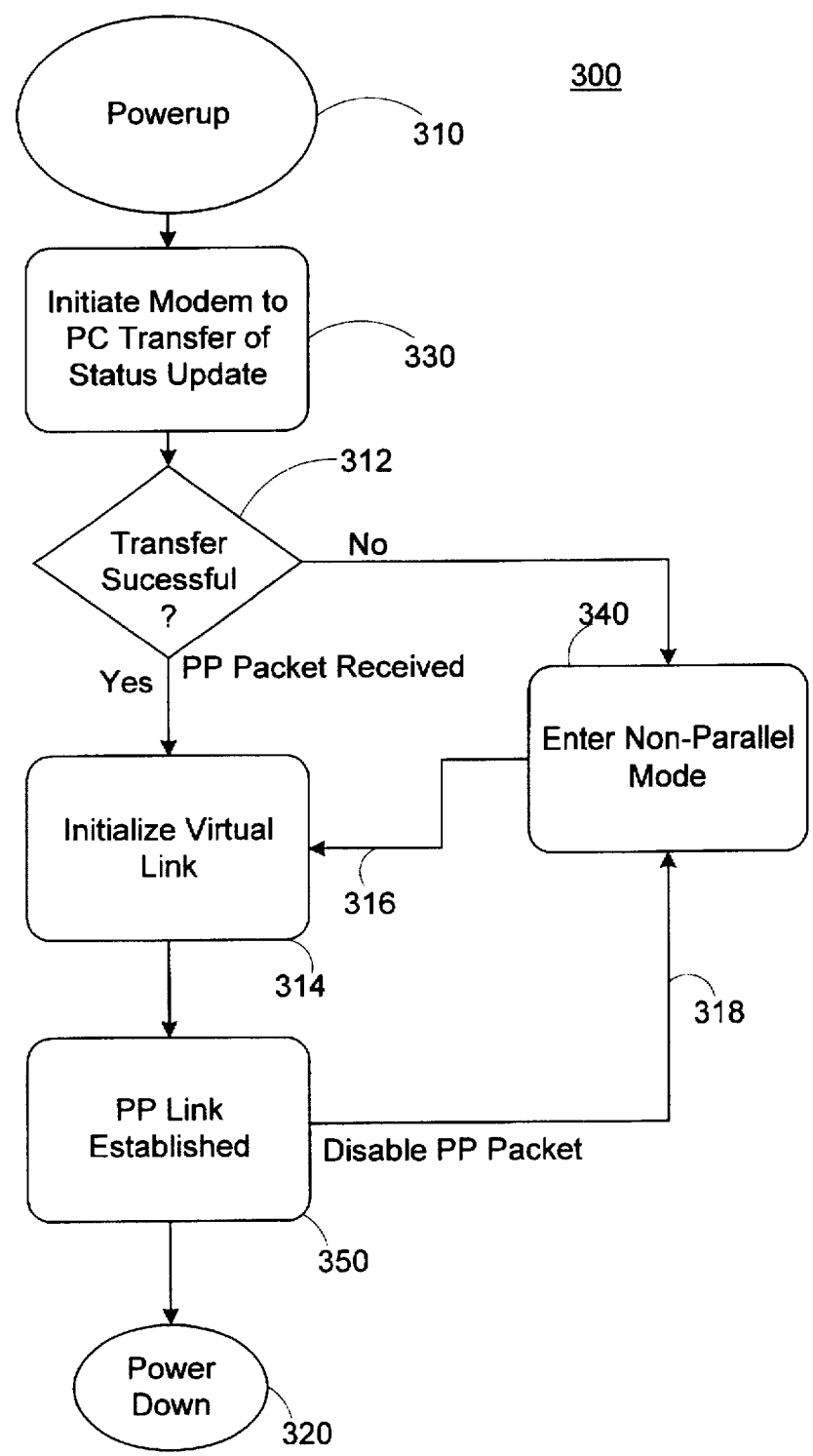
FIGS. 7–13 are flow charts describing the operation of the modem of FIG. 2 connected to a personal computer (PC) in accordance with the preferred embodiment of the invention, with the computer operating under a multitasking operating system.

FIG. 7 shows the modem system flow diagram. On powerup, at 330 the modem 20 attempts to initiate a modem to PC transfer of status via the parallel port. If the transfer is successful, a parallel link is established at 350 and the modem will enter the parallel transfer mode. The modem will continue to use the parallel port to transfer status and data to the PC. If the transfer fails, the modem will enter serial transfer mode at 340 and function like a conventional modem.

If the modem is in a serial transfer mode at 340 and a parallel packet is received at 316, the modem will enter parallel mode at 314. If the modem is in parallel mode and it receives a Disable PP Packet at 318 it will change to a serial transfer mode at 340.

Figure 8:
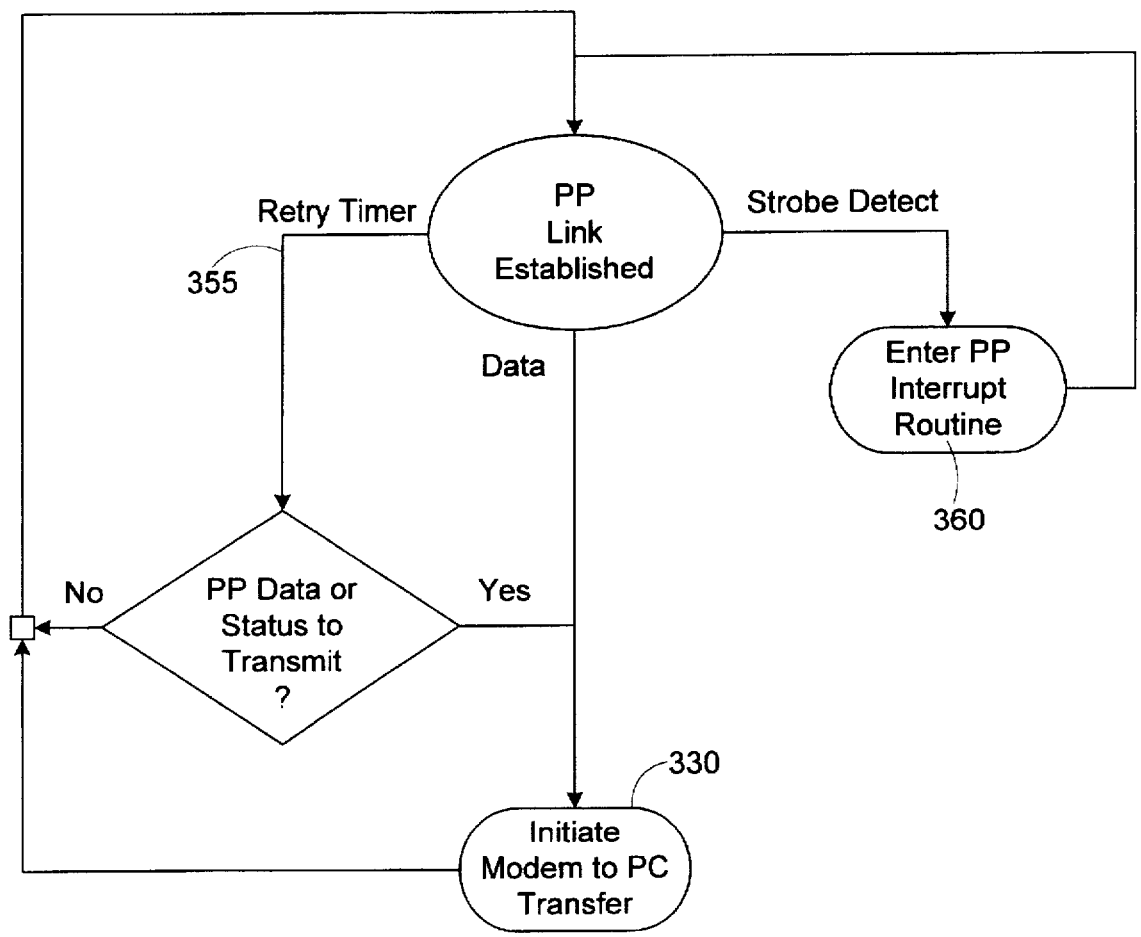

FIG. 8 shows the basic modem functions once a parallel link has been established at 350. From the parallel link established state at 350, the modem will execute foreground and background processes until an interrupt is received. Three events affect the operation of the parallel port: one is when the strobe rising edge is detected at 360, the second is when the modem has data to transmit to the PC at 330 and the third is after the retry timer expires at 355.

Figure 9:
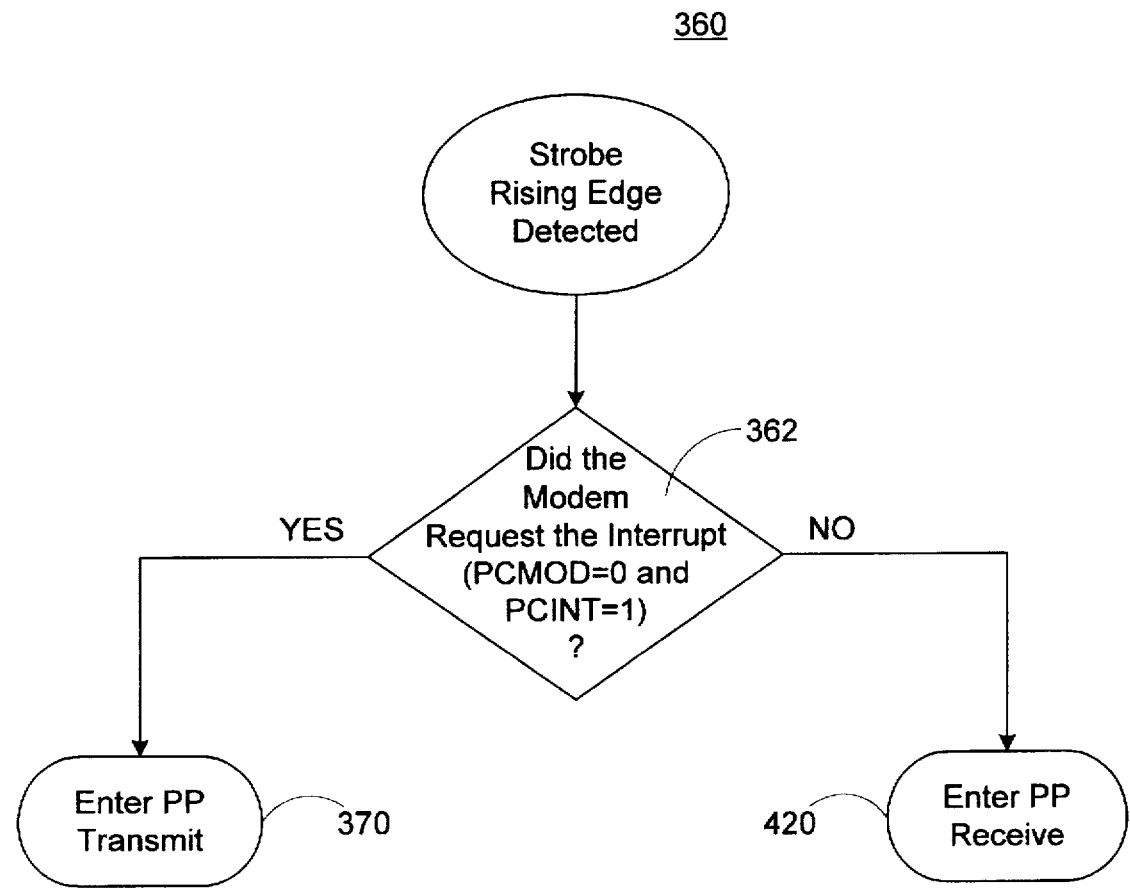

If the modem detects the rising edge of the strobe, it enters the parallel port interrupt routine at 360. As shown in FIG. 9, the first step in the process at 362 is to determine whether the modem requested control of the data bus in order to transmit data or whether the PC is requesting control of the data bus to transmit data. If the PC/Modem line is low and the PCINT line is high, this indicates that the modem requested control of the data bus in order to transmit data to the PC at 370. If the PC/Modem line is high and the PCINT line is low, this indicates that the PC is requesting control of the data bus in order to transmit data to the modem at 420.

Figure 10:
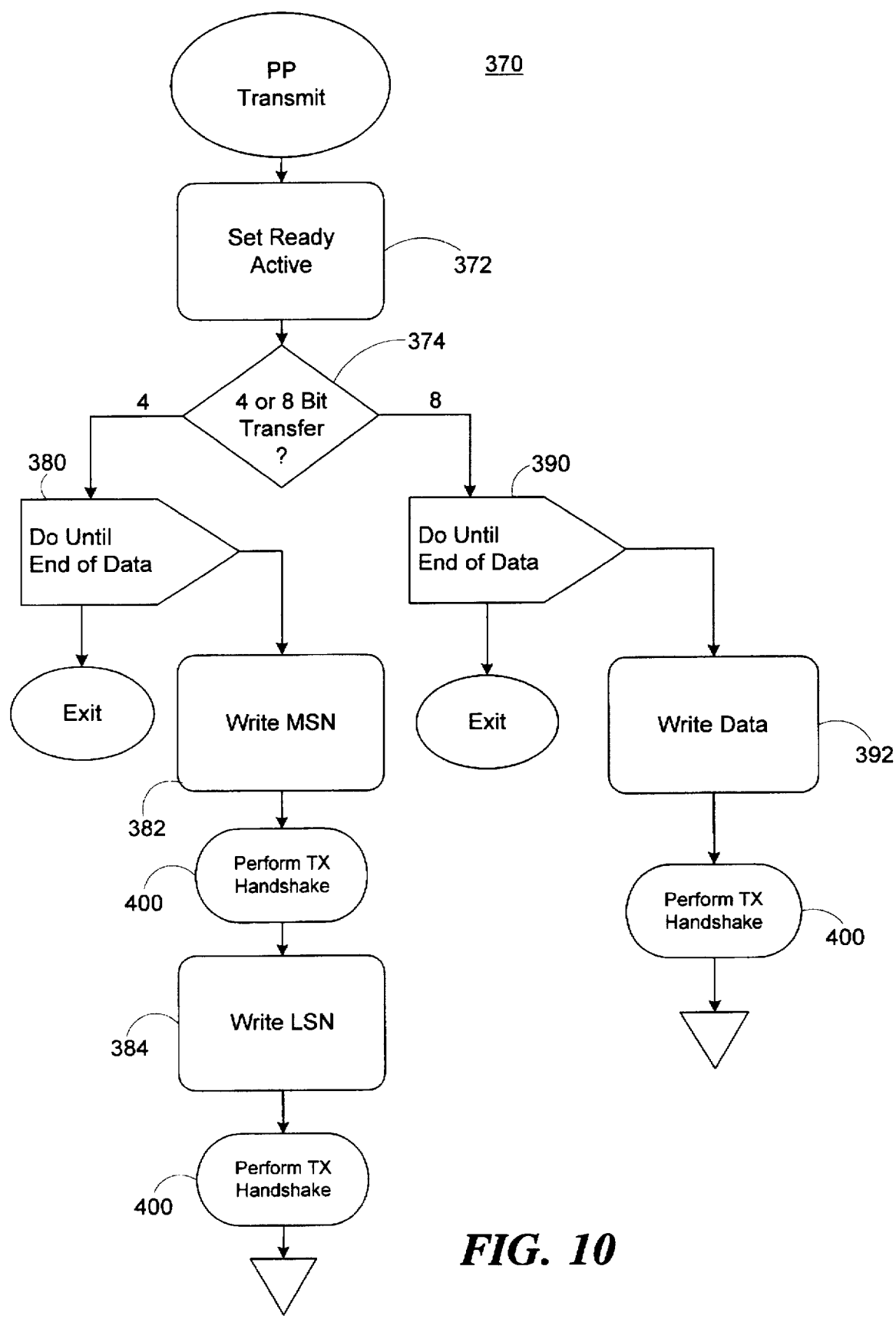

As shown in FIG. 10, the modem parallel port transmit process at 370 begins with modem setting the Ready line active (low) at 372 indicating it has data to send. The modem then checks at 374 the EPP line to determine if the data transfer will be via 4 or 8 bits. If EPP is high, the modem will begin transferring data 8 bits at a time at 390. If EPP is low the modem will begin transferring data 4 bits at a time at 380.

Figure 11:
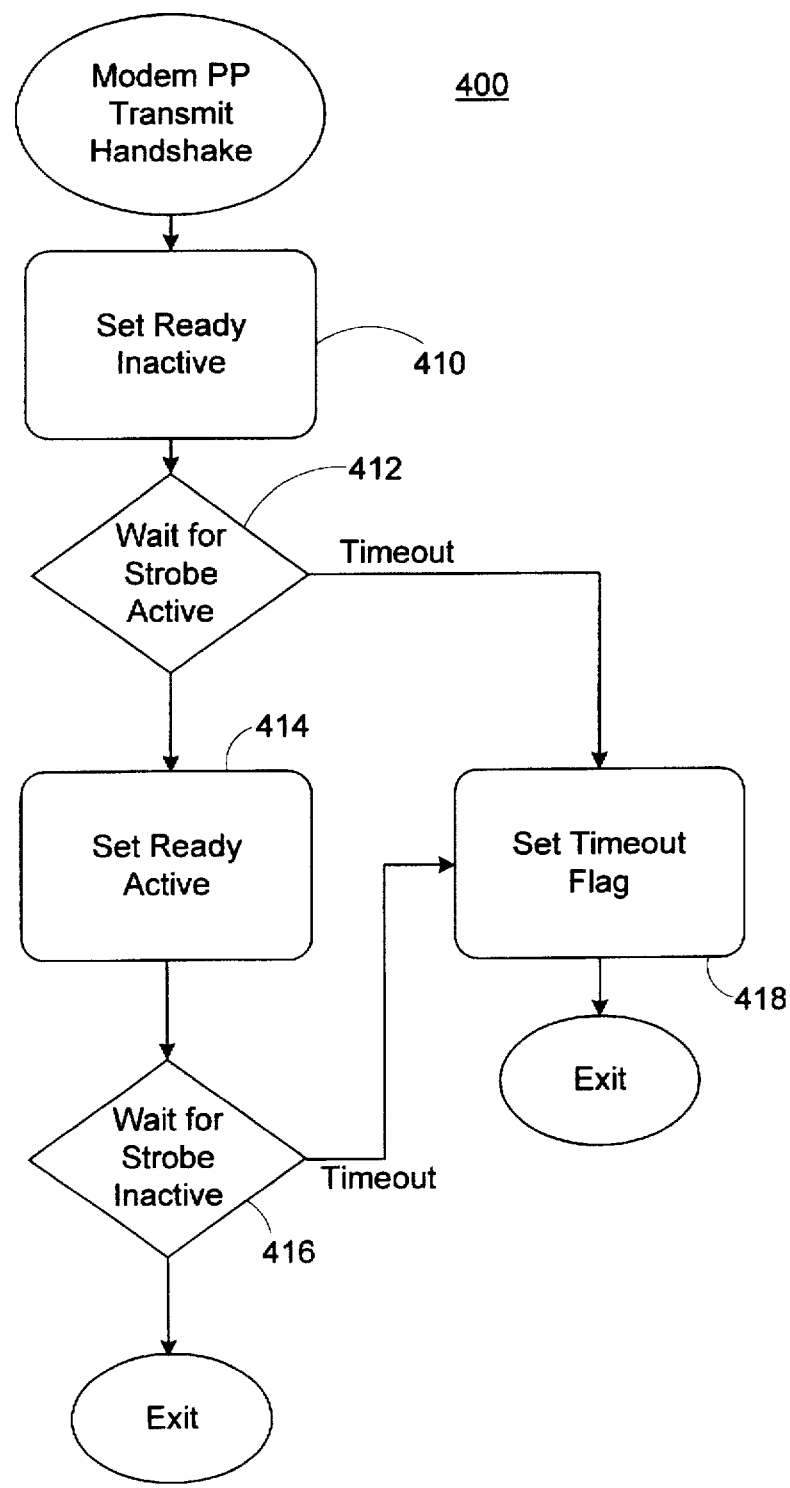

At this point both sides are synchronized and will enter their polling loops at 380, 390 and the block transfer will begin. FIG. 10 shows the modem transmit process and FIG. 11 shows the transmit handshake process. The modem will then write the next nibble (at 392) or byte (at 382) of data and set the Ready line inactivate (high) at 410. Upon detecting the Ready line inactive (high), the PC will read the byte of data, and set the Strobe line active (low) and wait for the Ready line to go active (low). Upon detecting the Strobe line active (low) at 412, the modem will set the Ready line active (low) at 414 and wait for the Strobe line to go inactive (high) at 416. Upon detecting the Ready line active (low), the PC will set the Strobe line inactive (high). This procedure will continue until the transfer is complete.

The handshake for both the 4 bit and the 8 bit transfers are the same. The only difference in the transfer process is that in order to transfer one byte, the 4 bit transfer sends the Most Significant Nibble (MSN) performs the handshake and then sends the Least Significant Nibble (LSN) and performs the handshake.

Figure 13:
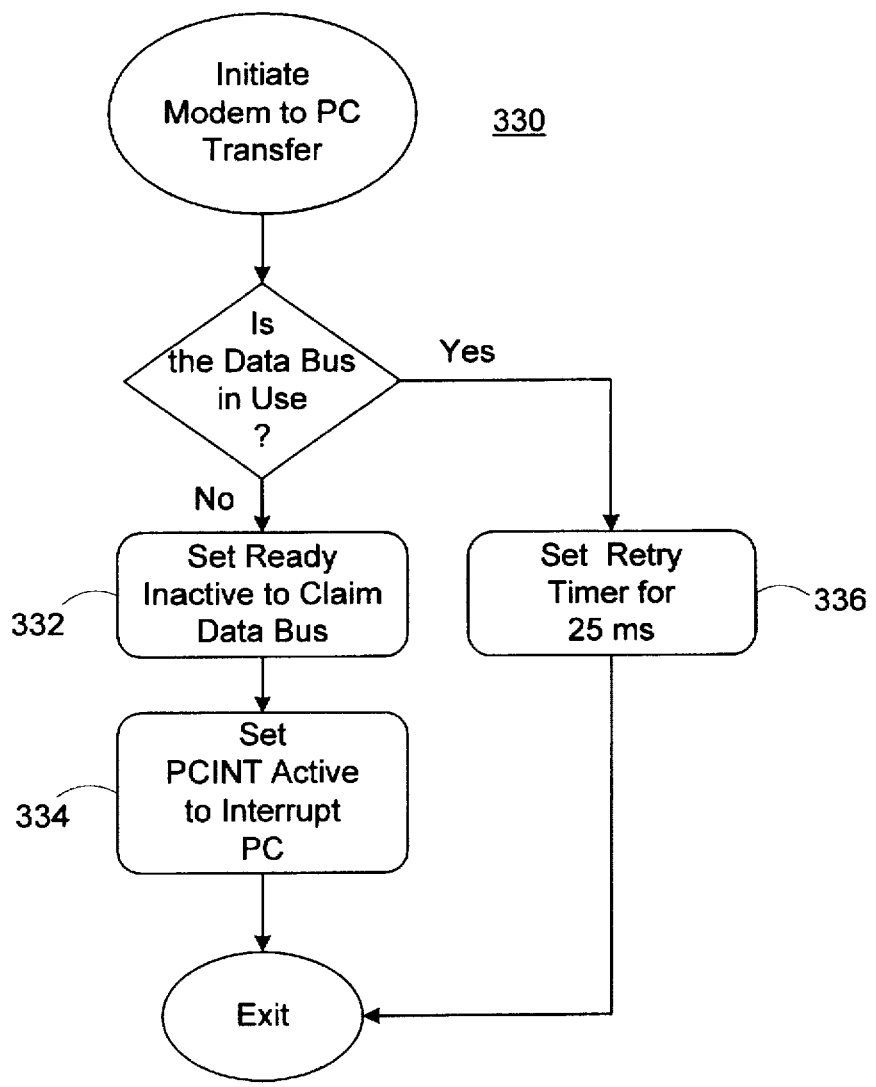

When the modem receives data to be sent to the DTE or is responding to a PC request for status, it has to initiate a modem to PC transfer at 330, as shown in FIG. 13. It must set the Ready line inactive at 332, and then raise the PCINT/ACK line to the PC to generate an interrupt at 334. When the PC gets to it's Interrupt Service Routine (ISR) it will toggle the Strobe line to signal that it is ready to receive data. The rising edge of the Strobe line will generate an interrupt on the modem. When the modem gets to it's ISR at 370 it will lower the PCINT/ACK line, and then activate (lower) the Ready line at 372 to signal that it is ready to send data. At this point both sides are synchronized and will enter their polling loops to begin the transfer of data.

If the modem attempts to initiate a modem to PC transfer at 330 and the data bus (parallel port) is in use, for example, the PC is sending data to the modem, the modem sets the retry timer at 336 and returns to the parallel link established state.

The length of time set by the retry timer will depend up the average time to transfer a block of data. In the preferred embodiment, the retry timer is set to 25 milliseconds.

When the retry timer expires, an interrupt is generated. If the modem has data or status to transmit 355 to the PC, it initiates a modem to PC transfer at 330.

Figure 12:
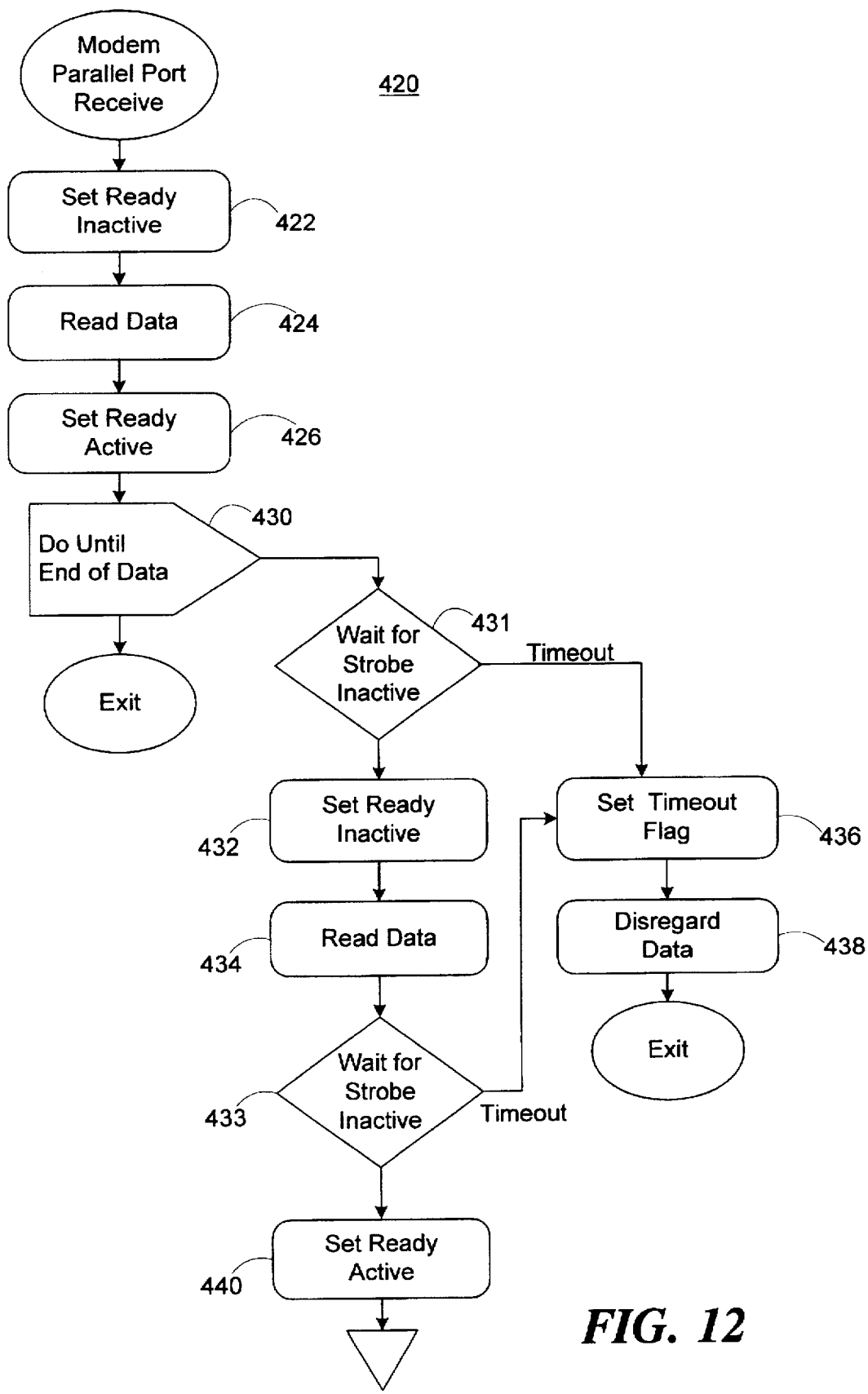

When the PC wants to initiate a data transfer, it must first raise the PC/Modem line to attempt to take control of the data bus. The PC must then wait for at least 5 μsec. to determine if the modem is attempting to transmit at the same time. If the Ready line does not go inactive (high) during the 5 μsec. period, the PC will then have control of the data bus and can begin transmitting. The PC will then write the first byte of data to the data port and then toggle the Strobe line. The rising edge of the Strobe signal at 360 will trigger an interrupt (INT1). Upon entering the ISR at 420, the Ready line will be immediately set inactive (high) at 422 to acknowledge the interrupt as shown in FIG. 12. The ISR will then read the 8 bits of data at 424 and set the Ready line active (low) at 426 to signal the PC it can accept more data. At this point both sides are synchronized and will enter their polling loops and the block transfer will begin. Upon detecting the Ready line active (low), the PC will write the next byte of data and set the Strobe line active (low), and wait for the Ready line to go inactive (high). Upon detecting the Strobe line active (low) the modem will set the Ready line inactive (high) at 432, read the data at 434, and wait for the Strobe line to go inactive (high). Upon detecting the Ready line inactive (high) the PC will set the Strobe line inactive (high) and wait for the Ready line to go active (low). Upon detecting the Strobe line inactive (high), the modem will set the Ready line active (low). This procedure will continue until the block transfer of data is complete.

Host PC Software Device Driver

The Host PC Device Driver enables the Host PC to communicate with the modem via the PC's parallel port. It controls the transfer of data and status information between the modem and the PC client application which requires a communications link with the modem. It also emulates the characteristics of a standard RS-232 serial communications link in a manner transparent to the client application. This is accomplished through the Parallel Port Virtual Asynchronous Protocol (PPVAP) which is described below in further detail. In addition, the Device Driver implements burst mode communications between DCE 20 and DTE 10.

Figure 14:
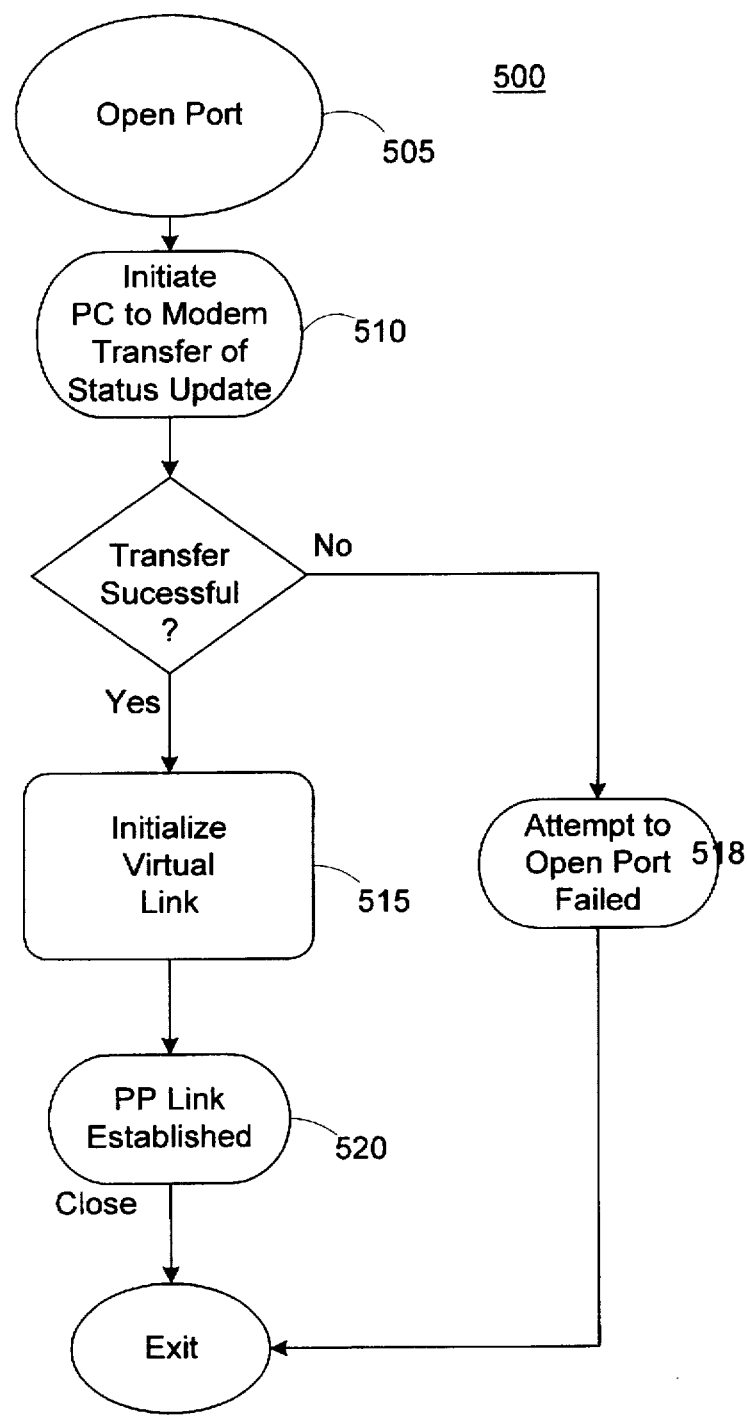
FIGS. 14–19 are flow charts describing the operation of the driver of the personal computer running Windows based communication application software and connected to the modem of FIG. 2.

FIG. 14 shows the Parallel Port Device Driver flow diagram. On powerup, the Parallel Port Device Driver attempts to open the parallel port at 505. The open parallel port process at 505 involves taking control of the parallel port and testing it to determine whether the port is a 4 bit port or whether the port is an 8 bit bidirectional port or an IEEE 1284 enhanced parallel port (EPP). This can be accomplished by any known conventional method, for example, data can be written to the parallel port, latched and then read back from the port. If the data send matches the data received, the port is an 8 bit bidirectional port. An EPP can be detected by calling a function in the PC BIOS Extension which reports whether the port is an EPP.

After opening the parallel port, the Parallel Port Device Driver attempts to initiate at step 510 a PC to modem transfer of a request for status update. If the transfer is successful the Device Driver initializes the serial port emulation on the virtual link at 515 and enters the parallel port (PP) link established state at 520. If the transfer fails at 518, the Device Driver remains idle and the client application must use the conventional serial link. Optionally, the Device Driver can attempt to communicate though the serial port and implement burst mode transfers as described below in detail. If, while the Device Driver is idle, the modem attempts to initiate a parallel link, Device Driver will become active and initialize the virtual link at 515 and enter the PP link established state at 520.

Figure 15:
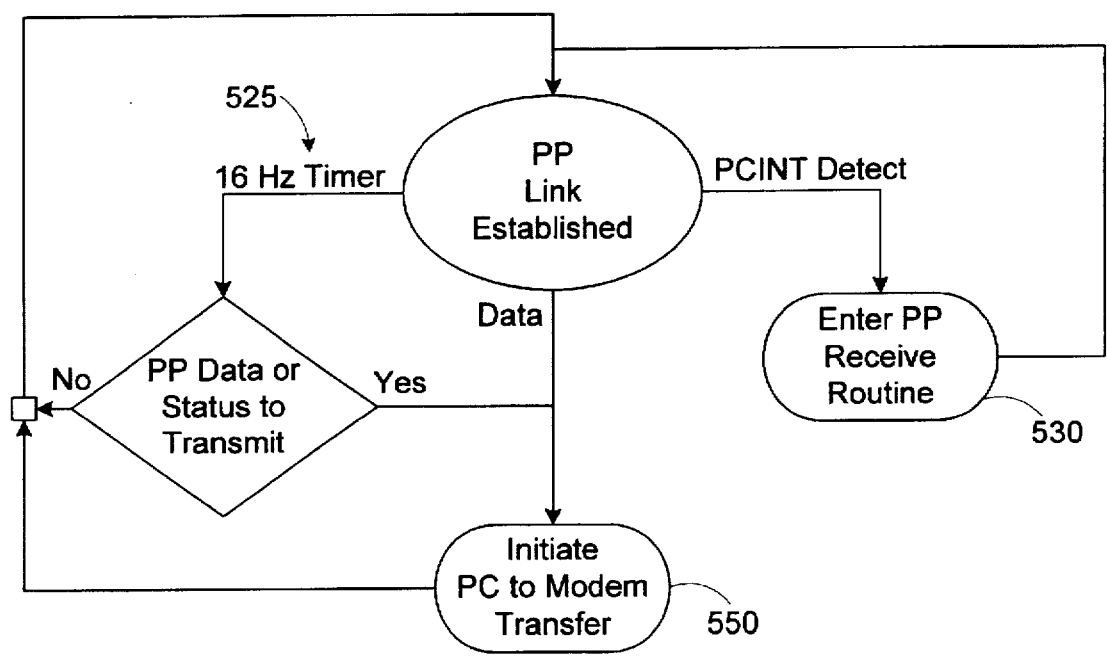

FIG. 15 shows the basic device driver functions once the PP link has been established at 520. In this state, the Device Driver remains idle until one of three events occur: 1) an external parallel port interrupt occurs 530, 2) the client application attempts to initiate a PC to modem transfer 550, or 3) the PC Clock timer interrupt occurs 525.

Figure 16:
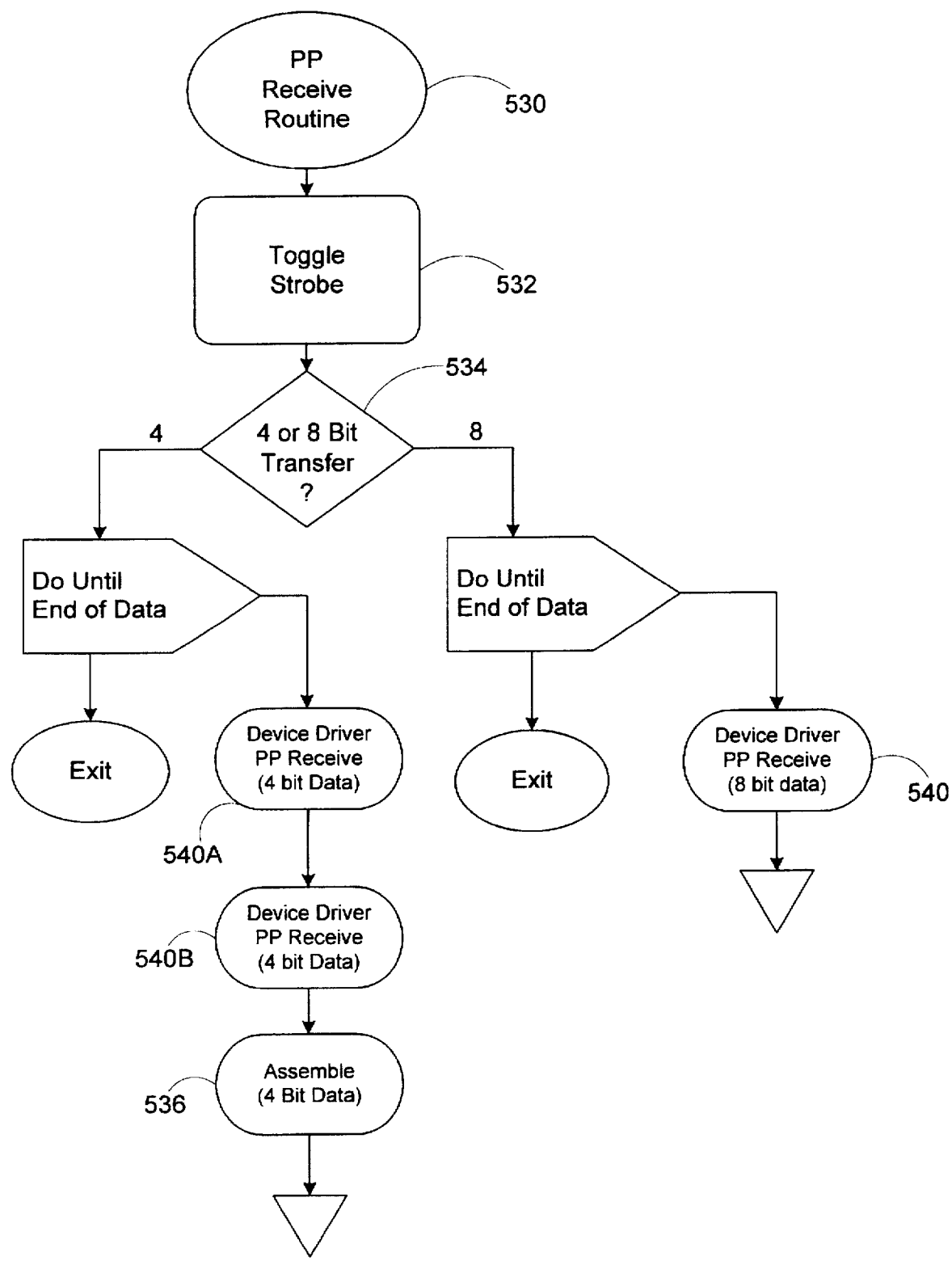

When an external parallel port interrupt occurs the Device Driver enters the Parallel Port (PP) Receive process at 530 to begin receiving data from the modem, FIG. 16. When the modem initiates a modem to PC transfer, it sets the ready line inactive and raises the PCINT/ACK line to the PC to generate the external parallel port interrupt. The Device Driver will enter the PP Receive process and immediately toggle the STROBE at 532 to signal that it is ready to receive data. The rising edge of the STROBE will generate a modem interrupt and the modem will enter its parallel port interrupt routine at 360. The modem will immediately lower the PCINT/ACK line and activate (lower) the READY line to signal that it has data to send. At this point both sides are synchronized and will enter their polling loops to begin transfer of data.

Depending upon whether the EPP line is high (a 4 bit or an 8 bit bidirectional port was detected on powerup) a 4 bit or 8 bit transfer will occur. 534. The 4 bit transfer occurs via what are normally considered status lines on the standard unidirectional parallel port. The handshake for both 4 bit and 8 bit transfers is the same. The only difference in the transfer process is that in order to transfer one byte, the 4 bit transfer receives the Most Significant Nibble (MSN) and performs the handshake at 540A and then receives the Least Significant Nibble (LSN) and performs the handshake at 540B.

Figure 17:
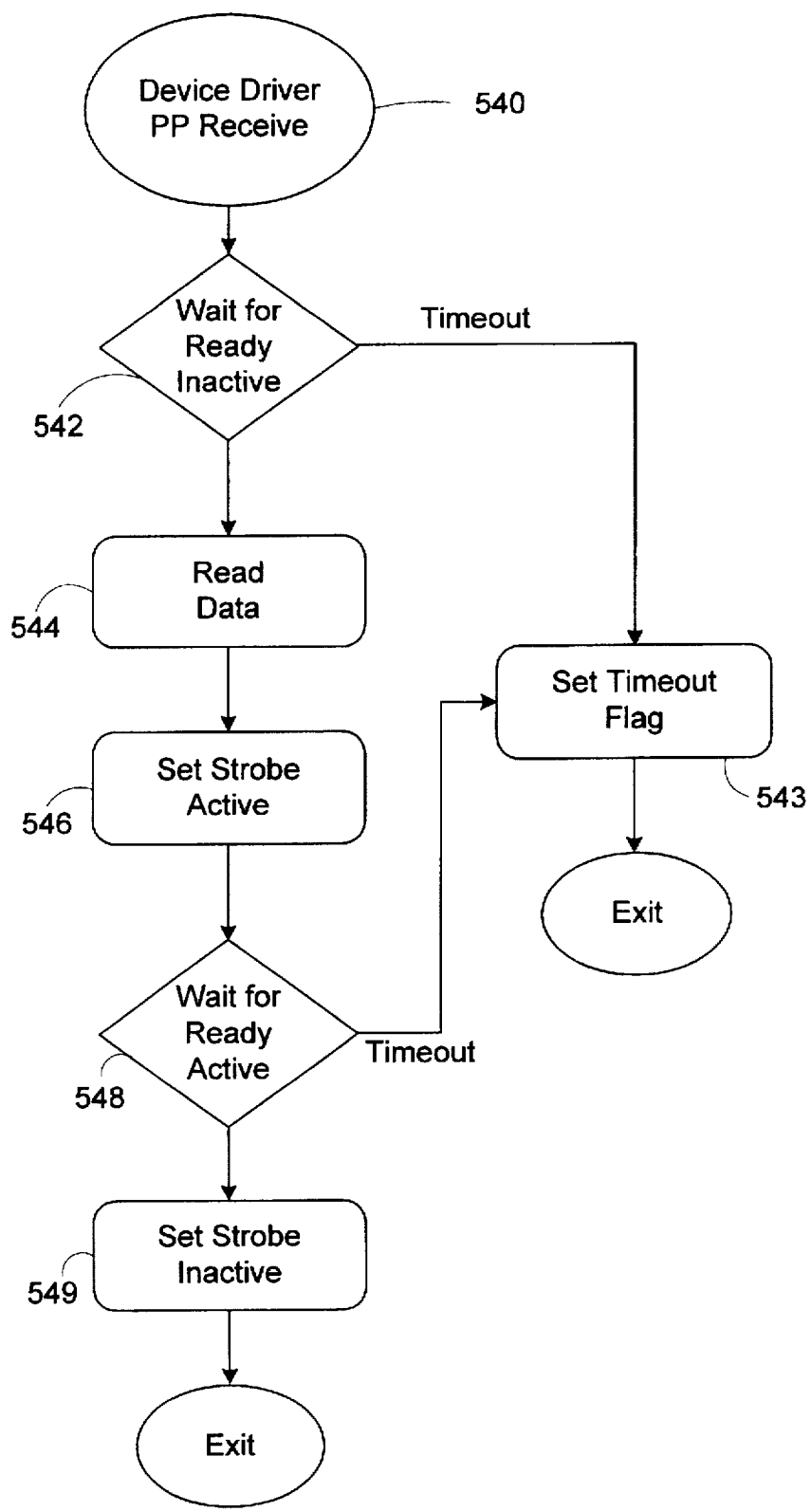

FIG. 17 shows the general PP receive process 540. The modem writes a byte of data and set the Ready line inactivate (high). Upon detecting the Ready line inactive (high) 543, the Device Driver will read the byte of data at 544, set the Strobe line active (low) at 546 and wait for the Ready line to go active (low). Upon detecting the Strobe line active (low), the modem will set the Ready line active (low) and wait for the Strobe line to go inactive (high). Upon detecting the Ready line active (low) at 548, the Device Driver will set the Strobe line inactive (high) at 549. This procedure will continue until the transfer is complete.

The Device Driver will buffer the data received from the modem and then transmit it to the client application. This is accomplished by conventional device redirection techniques. For DOS based client applications, the redirection requires the application to support virtual communications ports via a software device driver such as a NASI (Netware Asynchronous Services Interface), a NCSI (Network Communications Services Interface) or INT 14 (BIOS Interrupt 14) interface. For Windows and other multitasking operating systems, the client application communicates through the standard Device Driver Application Programming Interface (API). In this case, the standard Device Driver API is either supplemented or replaced by a device driver which can interface with the parallel port and/or implement burst mode communications.

When the client application has data to send to the modem, it will attempt to write to a serial port. The Device Driver will receive the serial port write function and redirect the data to the parallel port. Similarly, the Device Driver will receive the serial port read function when the client application queries the serial port for status. In either case, the Device Driver will have to initiate a PC to modem transfer. In the latter case, the Device Driver sends a request for status command packet. In the preferred embodiment, the modem continuously sends the Device Driver status updates as the status information changes and the Device Driver stores this information in memory. When the client application requests status information, the Device Driver reads the status information from memory.

Figure 18:
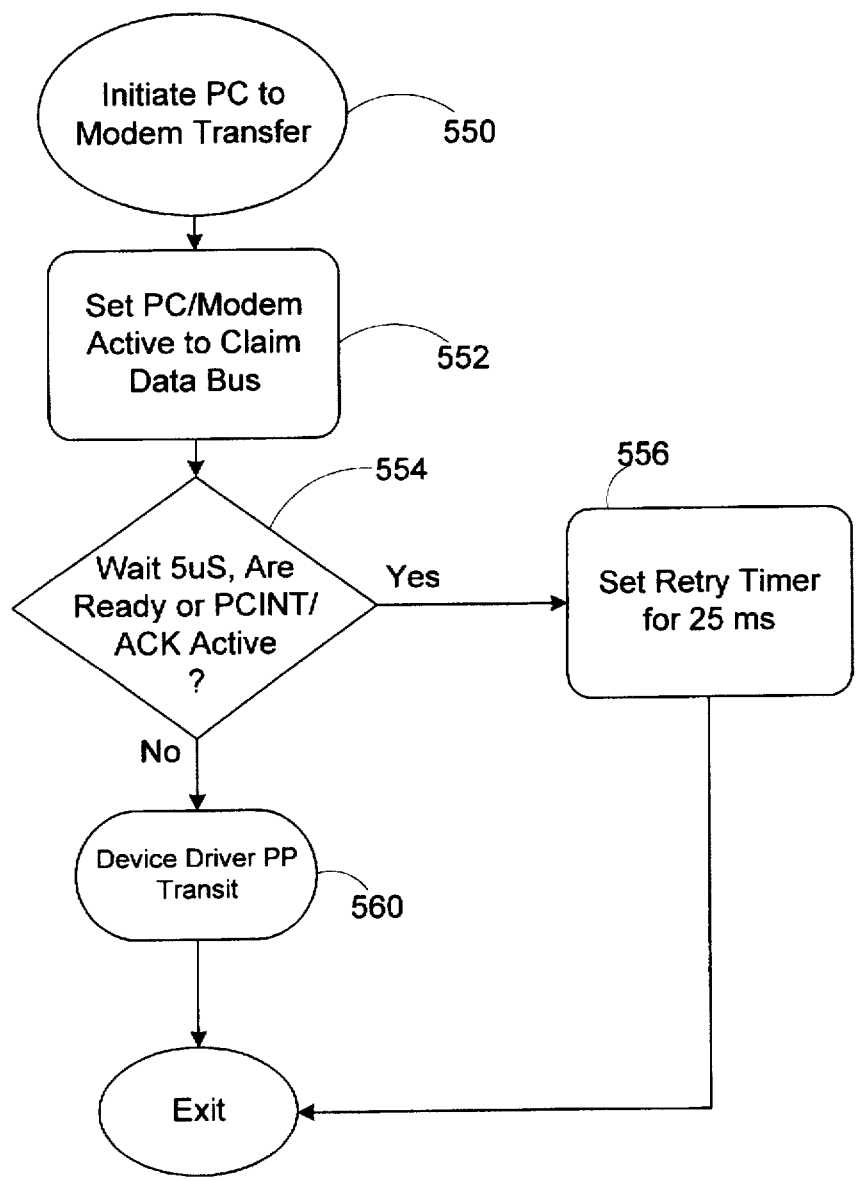
Figure 19:
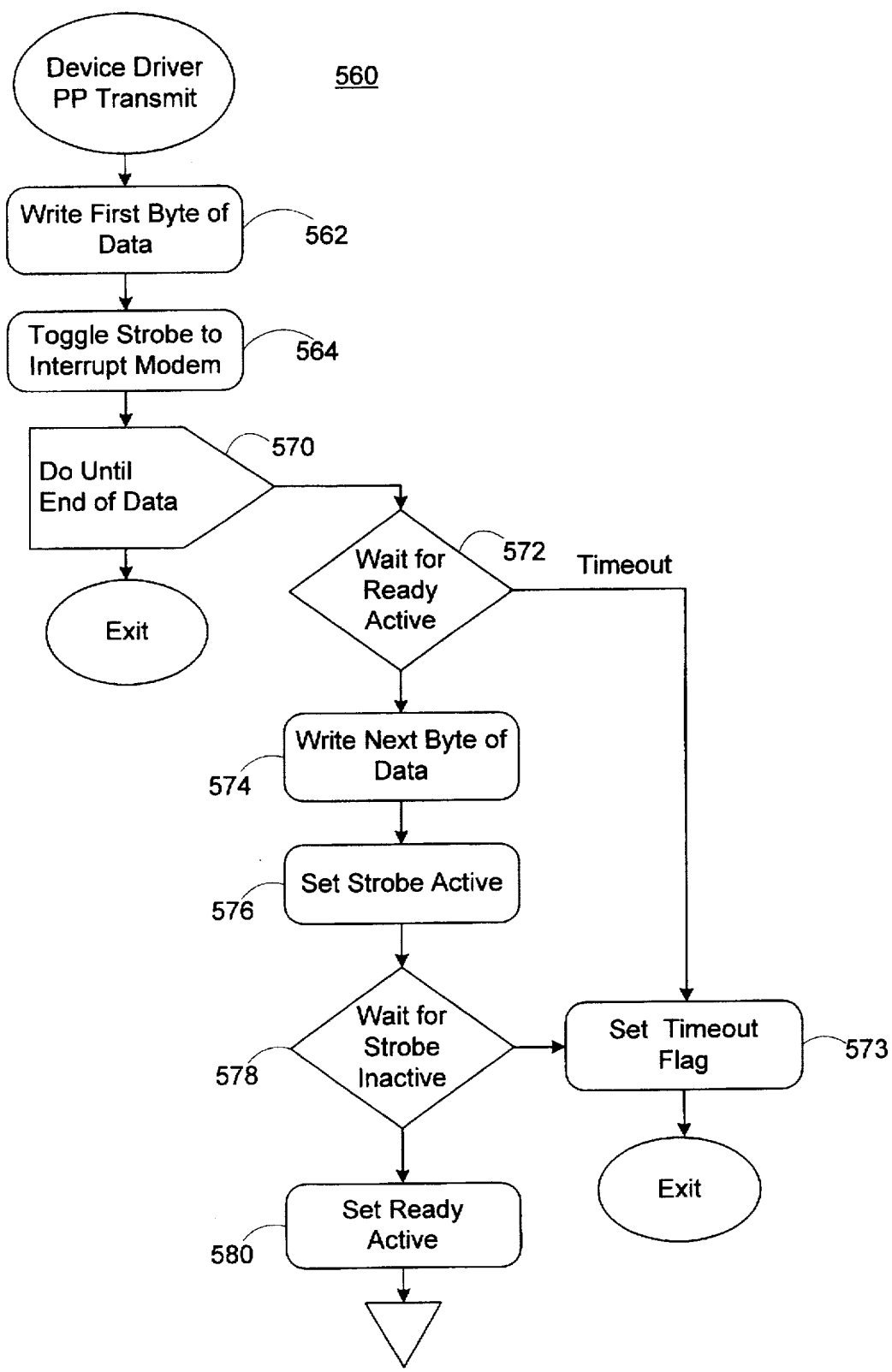

As shown in FIG. 18, when the Device Driver wants to initiate a PC to modem data transfer at 550, it must first raise the PC/Modem line at 552 to attempt to take control of the data bus (parallel post). The Device Driver must then wait for at least 5 μsec. at 554 to determine if the modem is attempting to transmit at the same time. If the PCINT/ACK line does not go active (high) and the Ready line does not go inactive (high) during the 5 μsec. period, the Device Driver will then have control of the data bus and can begin transmitting. The Device Driver will begin the PP transmit process at 560. As shown in FIG. 19, the Device Driver at 562 will then write the first byte of data (a command byte) of a packet to the data port and then toggle the Strobe line at 564. The rising edge of the Strobe signal will trigger a modem interrupt (INT1). Upon entering the ISR, the Ready line will be immediately set inactive (high) to acknowledge the interrupt. The ISR will then read the 8 bits of data and set the Ready line active (low) to signal the PC it can accept more data. At this point both sides are synchronized and will enter their polling loops and the block transfer will begin. The Device Driver polls the parallel port for the status of the Ready line at 572. Upon detecting the Ready line active (low), the Device Driver will write the next byte of data at 574 of the packet, set the Strobe line active (low) at 576, and wait for the Ready line to go inactive (high) at 578. Upon detecting the Strobe line active (low) the modem will set the Ready line inactive (high), read the data, and wait for the Strobe line to go inactive (high). Driver polls the parallel port for the status of the Ready line at 578. Upon detecting the Ready line inactive (high) at 578, the Device Driver will set the Strobe line inactive (high) at 580. Upon detecting the Strobe line inactive (high), the modem will set the Ready line active (low). This procedure will continue until the block or packet transfer is complete.

If the Device Driver is unable to take control of the data bus to transmit, for example because the modem attempted to transmit at the same time, the Device Driver will return to PP link established (idle) state at 520, FIG. 15. Every time a PC Clock interrupt is generated at 522, approximately 16 times per second, the Device Driver checks to see if it has data or status to transmit to the modem at 524. If so, the Device Driver will again attempt to initiate a PC to modem transfer at 550 and take control of the data bus.

Parallel Port Virtual Asynchronous Protocol

In addition to controlling the physical transfer to data between the modem and the PC, the Host PC Device Driver controls the communications link between the client application and the modem. Because the parallel interface does not include the same status information lines as a standard RS-232 serial interface, the Device Driver creates a virtual link which emulates the communication of status information in a way that is transparent to the client application. This is accomplished via the Parallel Port Virtual Asynchronous Protocol (PPVAP). This protocol also implements burst mode communication which permits the Device Driver and the modem to transmit packets of data in either direction at very high speeds.

The PPVAP protocol is based on simple packets consisting of a command byte followed by one or more parameter bytes. The most significant bit of the command byte determines the type of the packet. There are two types of packets, control-status packets and data packets. The second most significant bit (bit #6) is the End of Data (EOD) bit. The transmitting side clears this bit when it has more data to send and sets this bit to indicate it is out of data. Its purpose is to provide information to the receiving side. The receiving side is not required to perform an action based on the state of this bit.

If the most significant bit of the command byte is a 1, then the packet contains control or status information. For a control-status packet, bits #5–#0 contain a control-status code which identifies the control or status information. Control-status codes with values greater than or equal to 48 (30h) are followed by sixteen (16) parameter bytes. All other control-status codes are followed by one (1) parameter byte to complete the packet. A summary list of the control-status codes is listed in Table 1 below and a full description of the function is provided in appendix C.

| Function | Value |
|---|---|
| Set Modem Control Register | 00 h |
| Request Modem Control Register | 01 h |
| Modem Control Register | 02 h |
| Set Line Control Register | 03 h |
| Request Line Control Register | 04 h |
| Line Control Register | 05 h |
| Request Modem Status Register | 06 h |
| Modem Status Register | 07 h |
| Request Line Status Register | 08 h |
| Line Status Register | 09 h |
| Drain | 0 Ah |
| Drain Complete | 0 Bh |
| Disable Transmitter | 0 Ch |
| Enable Transmitter | 0 Dh |
| Set Maximum Data Packet Size | 0 Eh |
| Echo | 0 Fh |
| Echo Response | 10 h |

-continued

| Function | Value |
|---|---|
| Bus Test | 11 h |
| Bus Test Response | 12 h |
| Request Maximum Data Packet Size | 13 h |
| Request Network Address | 14 h |
| Request Firmware Revision | 15 h |
| Request PPVAP Flow Control State | 16 h |
| PPVAP Flow Control State | 17 h |
| Disable Parallel Port | 18 h |
| Network Address | 30 h |
| Firmware Revision | 31 h |

Control-status packets allow the Device Driver to emulate the status lines of an RS-232 serial interface. Optionally, the protocol can be modified to emulate any other serial interface or to be compatible with the IEEE 1284 Enhanced Parallel Port Specification. When the client application attempts to write to the serial port via the modem control register, the Device Driver intercepts the action and sends control-status packet 00h, Set Modem Control Register to the modem to produce the desired change in status. Similarly, if the client application attempts to read the modem control register, the Device Driver intercepts the action and sends control-status packet 01h, Request Modem Control Register to the modem. The modem receives the request and sends back the contents of the modem control register as a control-status packet 02h, Modem Control Register. In this way the modem and the Device Driver emulate the serial interface.

If the most significant bit (bit #7) of the command byte is a 0, then the packet contains data. The format of a data packet is as follows. Bits #5–# contain the length field of the data packet. A length can be between 01h (1 byte) and 3Fh (63 bytes). A zero length field is reserved for future use such as to extend the packet length. The rest of the bytes in the packet contain data.

The Device Driver implements burst mode data transfers by specifying the length of the data packet to be greater than one. When the Device Driver receives a packet of data from the modem, it is stored in a buffer and then transferred to the client application. When the client application sends data to the serial port, the Device Driver receives the data, stores it in a buffer and then transmits it as one or more packets of data to the modem. Because the transmission of data in packets is more efficient than transmitting data one byte at time, PC is able to transmit data faster without increasing the burden on the CPU.

In the preferred embodiment, both the modem and the PC utilize the same packet size. Consequently, if either the modem or the PC requests that packets be of a specific size, that size packet will be utilized in both directions. The preferred packet size is 64 bytes (1 command byte and 63 data bytes) because it provides the most efficient use of interrupt overhead. However, empirical data and experience have shown 32 byte packets to be optimal for a wide variety of operating parameters including DTE CPU speed and modem CPU speed. The device driver can include a routine which evaluates specific parameters of the DTE, such as CPU speed and interrupt traffic to determine the optimal packet size. This determination can be performed on power-up or on a periodic basis to permit dynamic optimization of packet size.

Burst mode transfers are accomplished by substantially similar processes in both the DTE or the DCE. The transmitter CPU (either DTE or DCE) initiates the transfer process either because it has data to send or on a polling interval. The transmitter disables interrupts, sends a single data packet at as fast a rate as possible (a burst) and enables interrupts. The receiver also disables interrupts, receives data and then enables interrupts. The transmitter then checks to see if more data is available to transfer, and if so the process is repeated.

The above process is applicable to both serial and parallel transfers. For PC's with ports (such as some parallel ports) that do not support interrupts or cannot be interrupt driven, the Device Driver will establish a polling interval whereby the Device Driver will poll the port to determine whether the modem was negotiating for control of the port. In the preferred embodiment, the polling is a time based polling interval based on the PC clock interrupt.

Optionally, the burst mode process can be modified to add an error recovery function to a standard (DTE-DCE) serial interface. The CPU (either DTE or DCE) initiates the transfer process either because it has data to send or on a polling interval. The transmitter disables interrupts, sends a single data packet at as fast a rate as possible (a burst) and enables interrupts. The receiver also disables interrupts, receives the data and then enables interrupts. If the correct number of bytes is received, the receiver then transmits an acknowledge signal to the transmitter (or if not an error signal). The transmitter, upon receipt of the acknowledge signal, checks to see if more data is available to transfer and the process is repeated. If the transmitter does not receive an acknowledge signal or receives an error signal, the transmitter enters a recovery sequence to resend the data packet.

In alternative embodiments, the DCE may include a single input/output device for substantially simultaneous transfer of data through the serial or parallel ports and the data pump. In addition, the DCE can be configured to simultaneously transmit and receive data with the DTE by utilizing both the serial and parallel interface, one to send and the other to receive. Alternatively, the parallel port can be used to transmit data and status in a full duplex mode, for example, a nibble in each direction, simultaneously. Optionally, data can be transferred via the parallel interface and status information transferred via the serial interface or vice versa.

The modem 20 therefore provides a high performance interface between it and a computer system irrespective of the application and operating software running on the computer system. The parallel interface transmits data at a much higher rate that the serial interface. The parallel interface enables the transfer of data between DTE and DCE in blocks at regular intervals using a burst mode technique. The data can be transferred through a standard printer parallel port of a computer system bidirectionally, without modifying the hardware of the computer system. A virtual serial link is thus created via a device driver utilizing a parallel interface through which data and status can be transferred so as to emulate a serial interface between a modem and computer system without effecting the application and operating programs running on the computer system.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A data communications system having at least one mode of operation for bidirectionally transferring data at a high performance rate between said system and data terminal equipment, said data terminal equipment including at least one equipment parallel port, said system comprising:

at least one system parallel port for coupling said communications system to said equipment parallel port of said data terminal equipment so as to create a parallel interface through which data can be transferred in parallel data units between said communications system and said data terminal equipment;

means for transmitting data in said parallel data units through said system parallel port to said equipment parallel port, and for receiving data in said parallel data units through said system parallel port from said equipment parallel port;

a system communications port for coupling said communications system to a telephone network so that parallel data units received from said data terminal equipment can be transmitted over said telephone network, and data received from said telephone network can be transmitted in said parallel data units through said system parallel port;

means for transmitting data to and receiving data from said data terminal equipment in accordance with a packetized data protocol, said packetized data protocol including transmitting data to and receiving data from said data terminal equipment in the form of packets comprising at least one command parallel data unit and at least one parameter parallel data unit, said at least one command parallel data unit including (a) means for indicating whether said packet is a control-status packet or a data packet, (b) means for indicating the type of control-status packet if said command parallel data unit indicates that the packet is a control status packet and (c) means for indicating the length of the packet if said command parallel data unit indicates that the packet is a data packet; and said at least one parameter parallel data unit including (i) control-status parameter information if said command parallel data unit indicates that the packet is a control-status packet and (ii) data if said command parallel data unit indicates that the packet is a data packet.

2. A system according to claim 1, wherein said system communications port is a serial port so that data received from said data terminal equipment can be serially transmitted over said telephone network, and data serially received from said telephone network can be transmitted in said parallel data units through said system parallel port.

3. A system according to claim 1, wherein said means for transmitting data in said parallel data units through said system parallel port to said equipment parallelport, and for receiving data in said parallel data units through said system parallel port from said equipment parallel port, includes means for transmitting and receiving said data in a burst mode.

4. A system according to claim 1, wherein each of said parallel data units is a byte.

5. A system according to claim 1, wherein each of said parallel data units is a nibble.

6. A system according to claim 1, wherein
said packetized data protocol includes means for transmitting data to and receiving data from said data terminal equipment in the form of packets comprising at least three parallel data units.

7. A system according to claim 1, further comprising:

means for transmitting data to and receiving data from said data terminal equipment in a burst mode whereby packets of parallel data units are transmitted to or received from said data terminal equipment in as fast a rate as possible.

8. A system according to claim 1, further comprising:

means for transmitting and receiving information characteristic of a serial interface through said system parallel port.

9. A modem having at least one mode of operation for bidirectionally transferring data at a high performance rate between a telephone network and a computer system including at least one computer parallel port for connecting said computer system to a printer, said modem further comprising:

at least one modem parallel port for coupling said modem to said computer parallel port so as to create a parallel interface through which data can be transferred in parallel data units between said modem and computer system;

means for transmitting data in said parallel data units through said modem parallel port to said computer parallel port, and for receiving data in said parallel data units through said modem parallel port from said computer parallel port;

a modem communications port for coupling said modem to said telephone network so that parallel data units received from said computer system can be transmitted over said telephone network and data received from said telephone network can be transmitted in said parallel data units through said modem parallel port;

means for transmitting data to and receiving data from said computer system in accordance with a packetized data protocol, said packetized data protocol including transmitting data to and receiving data from said computer system in the form of packets comprising at least one command parallel data unit and at least one parameter parallel data unit, said at least one command parallel data unit including (a) means for indicating whether said packet is a control-status packet or a data packet, (b) means for indicating the type of control-status packet if said command parallel data unit indicates that the packet is a control status packet and (c) means for indicating the length of the packet if said command parallel data unit indicates that the packet is a data packet; and said at least one parameter parallel data unit including (i) control-status parameter information if said command parallel data unit indicates that the packet is a control-status packet and (ii) data if said command parallel data unit indicates that the packet is a data packet.

10. A modem according to claim 9, wherein said modem communications port is a serial port so that data received from said computer can be serially transmitted over said telephone network, and data serially received from said telephone network can be transmitted in said parallel data units through said modem parallel port.

11. A system according to claim 9, wherein said packetized data protocol includes means for transmitting data to and receiving data from said computer system in the form of packets comprising at least three parallel data units.

12. A system according to claim 9, further comprising:

means for transmitting data to and receiving data from said computer system in a burst mode whereby packets of parallel data units are transmitted to or received from said computer system in as fast a rate as possible.

13. A modem according to claim 9, further comprising:

means for transmitting and receiving information characteristic of a serial interface through said modem parallel port.

14. A data communications system for bidirectionally transmitting information including data at a high performance rate between a system parallel port of said data communications system and data communications equipment including at least one equipment parallel port, said system comprising:

means for bidirectionally transmitting information between said equipment parallel port and said system parallel port in parallel information units, according to a predefined information transmission protocol;

means for bidirectionally transmitting command instructions in accordance with said predefined information transmission protocol between said data communications equipment and said data communications system and for bidirectionally transmitting status information in accordance with said predefined information transmission protocol between said data communications system and said data communications equipment; and means for transmitting information in a burst mode including at least one packet of information comprising a plurality of parallel information units, wherein said at least one packet includes (a) a predetermined quantity of parallel information units and (b) means for indicating the quantity of parallel information units in said packet.

15. A system according to claim 14, further including means for transmitting information including data, command instructions, and status information in the form of parallel information packets each comprising at least one parallel information unit all in accordance with said predefined information transmission protocol.

16. A system according to claim 15, wherein said at least one parallel information unit includes means for indicating whether said parallel information packet includes command instructions, status information or data.

17. A system according to claim 15, wherein each of said parallel information packets includes at least one command unit and at least one parameter unit.

18. A system according to claim 17, wherein said command unit includes means for indicating whether said parameter unit includes command instructions, status information or data.

19. A system according to claim 14, wherein said means for transmitting information in a burst mode includes means for transmitting said information as a plurality of packets of information, each packet comprising at least one parallel information unit, and wherein at least one information packet includes means for indicating whether said at least one information packet is the last packet to be transmitted.

20. A system according to claim 14, wherein data, command instructions and status information are transmitted between said data communications system and said data communications equipment via a parallel interface having status lines indicating status conditions of said data communications system or said data communications equipment and wherein said system further includes means for determining whether data, command instructions and status information is transmitted irrespective of the status conditions of said status lines.

* * * * *